US012562675B2

(12) United States Patent
de Fresart et al.

(10) Patent No.: US 12,562,675 B2
(45) Date of Patent: Feb. 24, 2026

(54) MOUNTING PIN FOR PHOTOVOLTAIC MODULE MOUNTING SYSTEM

(71) Applicant: ARRAY TECH, INC., Albuquerque, NM (US)

(72) Inventors: Benjamin de Fresart, Chandler, AZ (US); Thierry Marin-Martinod, Chandler, AZ (US); Nick Ibis, Phoenix, AZ (US)

(73) Assignee: ARRAY TECH INC., Albuerquerque, NM (US)

( * ) Notice: Subject to any disclaimer, the term of this patent is extended or adjusted under 35 U.S.C. 154(b) by 30 days.

(21) Appl. No.: 18/652,594

(22) Filed: May 1, 2024

(65) Prior Publication Data

US 2024/0283388 A1     Aug. 22, 2024

Related U.S. Application Data

(62) Division of application No. 18/334,265, filed on Jun. 13, 2023, now Pat. No. 12,028,013.

(60) Provisional application No. 63/380,037, filed on Oct. 18, 2022.

(51) Int. Cl.
  *H02S 20/23*     (2014.01)
  *F16B 5/06*      (2006.01)

(52) U.S. Cl.
  CPC ............... *H02S 20/23* (2014.12); *F16B 5/06* (2013.01)

(58) Field of Classification Search
  None
  See application file for complete search history.

(56) References Cited

U.S. PATENT DOCUMENTS

| | | | |
|---|---|---|---|
| 2014/0199135 A1* | 7/2014 | Hable ................. | C09D 163/10 |
| | | | 521/134 |
| 2015/0311854 A1 | 10/2015 | Goehringer | |
| 2018/0062568 A1* | 3/2018 | Schulte ................. | F24S 25/65 |
| 2021/0313926 A1 | 10/2021 | Cavieres | |
| 2022/0200522 A1 | 6/2022 | De Fresart | |

FOREIGN PATENT DOCUMENTS

| | | |
|---|---|---|
| CA | 3192521 A1 | 3/2022 |
| WO | 2022183204 A1 | 9/2022 |

OTHER PUBLICATIONS

European Patent Office; International Search Report and Written Opinion issued in Int'l App. No. PCT/US2023/035301 dated Feb. 21, 2024; 10 pages.

* cited by examiner

*Primary Examiner* — Daniel P Malley, Jr.
(74) *Attorney, Agent, or Firm* — MASCHOFF BRENNAN

(57)     ABSTRACT

A module mounting assembly that couples a PV module to a support structure is provided. The module mounting assembly may include a mounting bracket, a mounting pin, and a clamp. The clamp may be configured to couple the mounting bracket to the support structure and the mounting pin may be configured to couple the mounting bracket to the PV module. The mounting pin may have a number of features and designs that facilitate positioning the mounting pin within the openings and retaining the mounting pin in an installed state.

8 Claims, 18 Drawing Sheets

100

112b  114a  110b

300

152a

150a

162b

154a

102

164

MOUNTING PIN FOR PHOTOVOLTAIC MODULE MOUNTING SYSTEM

CROSS-REFERENCE TO RELATED APPLICATIONS

This application claims the benefit of U.S. patent application Ser. No. 18/334,265, filed on Jun. 13, 2023, which claims the benefit of and priority to U.S. Patent Application Ser. No. 63/380,037, filed on Oct. 18, 2022; the disclosures of which are incorporated herein by reference in their entireties.

TECHNICAL FIELD

The embodiments discussed in the present disclosure are related to mounting pins for use in photovoltaic (PV) module mounting systems.

BACKGROUND

Generating power through the use of photovoltaic (PV) modules is becoming more popular both in commercial applications, where large numbers of PV modules may be arranged in rows to collect sunlight and generate energy, as well as personal applications, where a smaller number of PV modules may be installed on a roof or other location to generate energy for private use. Regardless of the application, PV modules must be securely mounted to an underlying support structure. To facilitate the mounting of a PV module to a support structure, PV modules often include a module rail that is coupled to the backside of a solar panel. The module rail may include one or more openings that can be used to secure a PV module to an underlying support structure.

In personal applications, this underlying support structure may include a frame that is mounted on a roof. In commercial applications, this underlying support structure may include a torque tube, which is mounted on one or more support posts, or piles. Torque tube interfaces may be used to secure the torque tube to the piles. In solar panel tracking systems (or systems in which the PV modules are able to track a location of the sun throughout the day), the torque tube may be coupled to the torque tube interface in a way that permits the torque tube to rotate relative to the pile.

To secure PV modules to underlying support structures, a variety of different types of connection mechanisms have been developed. However, conventional connection mechanisms often include a plurality of components and require specific tools to install, making them expensive, complicated, and time consuming to use. Accordingly, there is a need for a connection mechanism for mounting a PV module to a support structure that is not only cost effective, but is also quick and easy to install.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used to limit the scope of the claimed subject matter.

Embodiments of the present disclosure address problems associated with conventional mechanisms that are used to couple a PV module to an underlying support structure, such as a torque tube. In one or more embodiments of the present disclosure, a module mounting assembly that couples a PV module to a support structure is provided. The PV module may include a solar panel and a module rail that is coupled to the solar panel. The module rail may define one or more mounting pin openings. In some embodiments, the PV module may also include a frame in which the solar panel is secured. In this embodiment, the module rail may be coupled to either the frame or the solar panel.

The module mounting assembly may include a mounting bracket, one or more mounting pins, and a clamp. The clamp may be configured to couple the mounting bracket to the support structure. The mounting bracket may also define one or more mounting pin openings. To couple the PV module to the support structure, one or more pin openings in the module rail may be aligned with one or more pin openings in the mounting bracket and the mounting pin may be positioned within these openings.

The mounting pin may have a number of features and designs that facilitate positioning and retaining the mounting pin within the openings. For example, in some embodiments, at least a portion of an exterior surface of the mounting pin may include a lubricant coating to facilitate insertion of the mounting pin into the pin openings. In other embodiments, a mounting pin may include features that maintain the mounting pin secure within the openings.

For example, to assist in retaining the mounting pin within the openings, the mounting pin may be a mounting clip that includes a first arm, a second arm, and a connecting component. The connecting component may be connected to the first arm and the second arm. A width of the mounting clip, when in an uninstalled state, may be slightly larger than a width of the pin openings. The connecting component may be configured such that when a compressive force is applied to the first and second arms, the mounting pin is placed into a compressed state in which it can be inserted into mounting pin openings. Once positioned within the mounting pin openings, the compressive force may be released so that the arms of the mounting clip engage with the sides of the mounting pin openings. As provided herein, the mounting pin may have additional features that prevent the mounting pin from being inserted to far into the pin openings and other features that prevent the mounting pin permanent deformation due to an excessive compressive force.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1A:
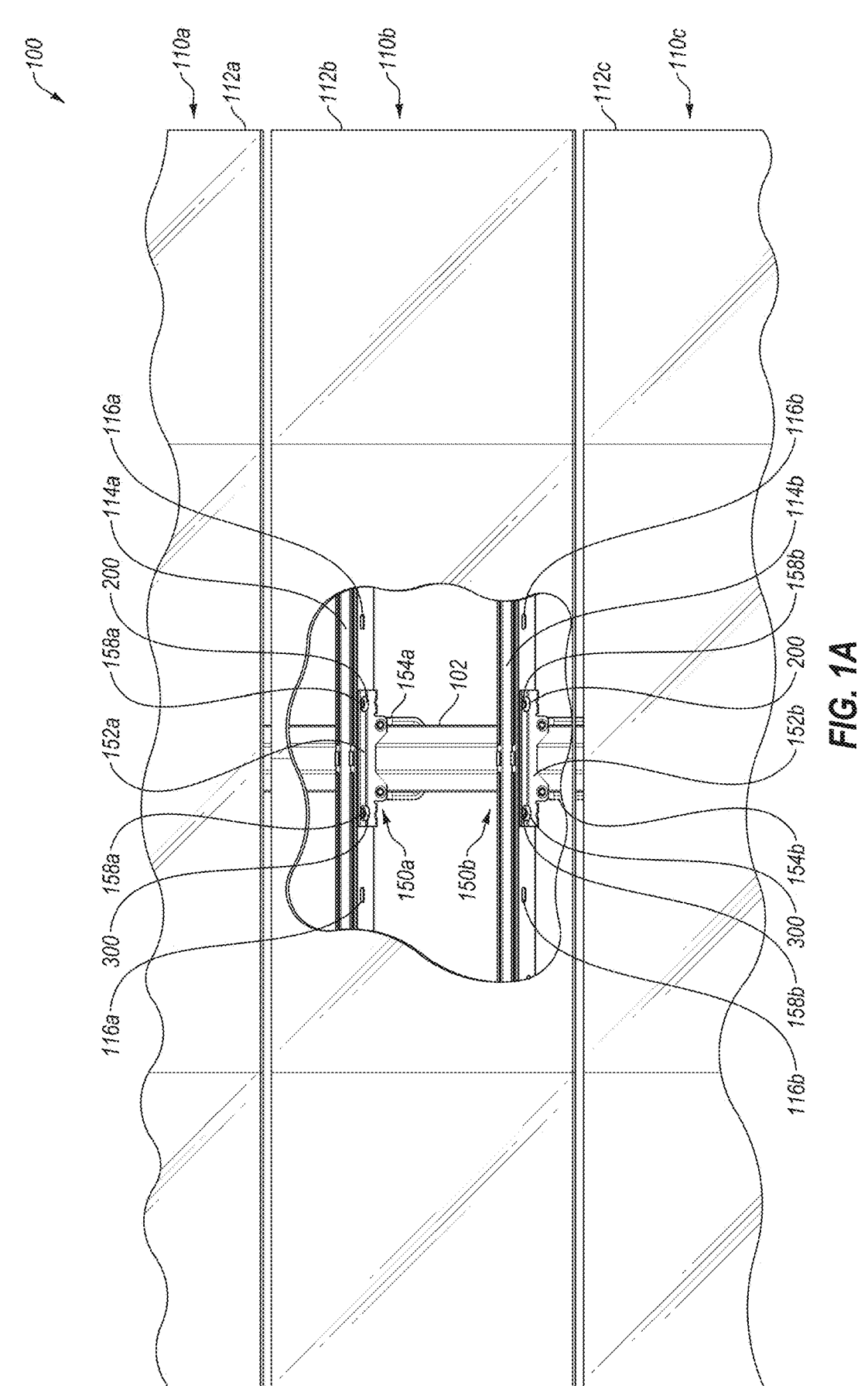
FIGS. 1A-1D illustrate an exemplary PV module mounting system.

Embodiments of the PV module mounting system disclosed herein may include a PV module, a module mounting assembly, and a support structure. The PV module may include a solar panel and a module rail. The module rail may be attached to a back surface of the solar panel. The module rail may extend along at least a portion of a length of the back surface of the solar panel. The module rail may also include one or more openings that can be used to secure the PV module to the support structure.

The PV module may be secured to the support structure. In some embodiments, the support structure may be a torque tube, a box frame, a ladder frame, a space frame, or another frame or structure suitable for mounting PV modules. In some embodiments, the support structure may be anchored to a base structure, such as a roof on a house or the ground.

A module mounting assembly may be used to secure the PV module to the support structure. The module mounting assembly may include one or more mounting pins, a mounting bracket, and a coupling mechanism that secures the mounting bracket to the support structure. The mounting bracket may also include one or more openings that may correspond in size and shape to the one or more openings on the module rail.

To mount the PV module to the support structure, the mounting bracket may be coupled to the mounting structure. Straps, clamps, screws, or another mechanical connecting mechanism may be used to couple the mounting bracket to the mounting structure. The one or more openings in the module rail may be aligned with the one or more holes in the mounting bracket. The mounting pins may be inserted through the aligned holes and a friction attachment between the pins and the holes may maintain the pins within the holes to secure the PV module to the support structure.

As provided in more detail herein, the mounting pins may include features and designs to facilitate insertion of the pins into the holes and to ensure that the pins remain secured within the holes. Unlike many conventional mounting technologies, the module mounting assemblies of the present disclosure may not require specialized tools for installation. For example, some conventional mounting technologies may require a hammer drill with a specialized adapter to apply force sufficient to install the mounting pins. The mounting pins of the present disclosure, according to some embodiments, may reduce complexity of an installation process by being compatible with standard tools such as pliers. Additionally or alternatively, the mounting pins according to some embodiments may further reduce complexity of the installation process by being capable of being installed manually, without any tools at all.

These and other embodiments of the present disclosure will be explained with reference to the accompanying Figures. It is to be understood that the Figures are diagrammatic and schematic representations of such example embodiments, and are not limiting, nor are they necessarily drawn to scale. In the Figures, features with like numbers indicate like structure and function unless described otherwise.

FIGS. 1A-1D illustrates an exemplary PV module mounting system 100 that includes a support structure 102, PV modules 110a, 110b, and 110c, and module mounting assemblies 150a and 150b. In the PV module mounting system 100, the support structure 102 includes a torque tube.

However, in other embodiments, a support structure may include a box frame, a ladder frame, a space frame, or another frame or structure suitable for mounting PV modules. The support structure 102 may also include another structure (not shown) that secures the torque tube to an underlying base surface. For example, in a ground mounted system, a support structure may include a pile that secures the torque tube to the ground. In a rooftop mounted system, a support structure may include a component that secures the torque tube to a rooftop.

The PV modules 110a, 110b, and 110c each include solar panels 112a, 112b, and 112c. Each of the solar panels 112a, 112b, and 112c include module rails that are attached to a backside of the solar panels 112a, 112b, and 112c. For example, in FIG. 1A, module rails 114a and 114b are visible through the cutaway portion of solar panel 112b. Additional module rails (not shown) may be similarly secured to the back sides of solar panels 112a and 112c. These module rails may also include a series of holes or openings that may be used to secure the solar panels to a support structure. For example, openings 116a in the module rail 114a and openings 116b in the module rail 114b can be seen in the system 100. These openings can have any shape and/or size. The openings 116a in the module rail 114a and openings 116b in the module rail 114b are oval in shape.

The module mounting assemblies 150a and 150b include mounting brackets 152a and 152b. The mounting brackets 152a and 152b are coupled to the support structure 102 through clamps 154a and 154b. The clamps 154a and 154b extend around the support structure 102 to retain the mounting brackets 152a and 152b in fixed positions relative to the support structure 102. The mounting brackets 152a and 152b may have cross-sectional U shapes, such that at least a portion of the module rails 114a and 114b can be seated inside of the mounting brackets 152a and 152b.

The mounting brackets 152a and 152b include openings 158a and 158b through which mounting pins are inserted. These openings 158a and 158b in the mounting brackets 152a and 152b are aligned with openings in the module rails 114a and 114b and are consistent in size and shape such that mounting pins can extend through openings in both the mounting brackets 152a and 152b and module rails 114a and 114b. The mounting pins may be retained within these openings through a friction fit to couple the PV module 110b to the support structure 102.

Figure 2A:
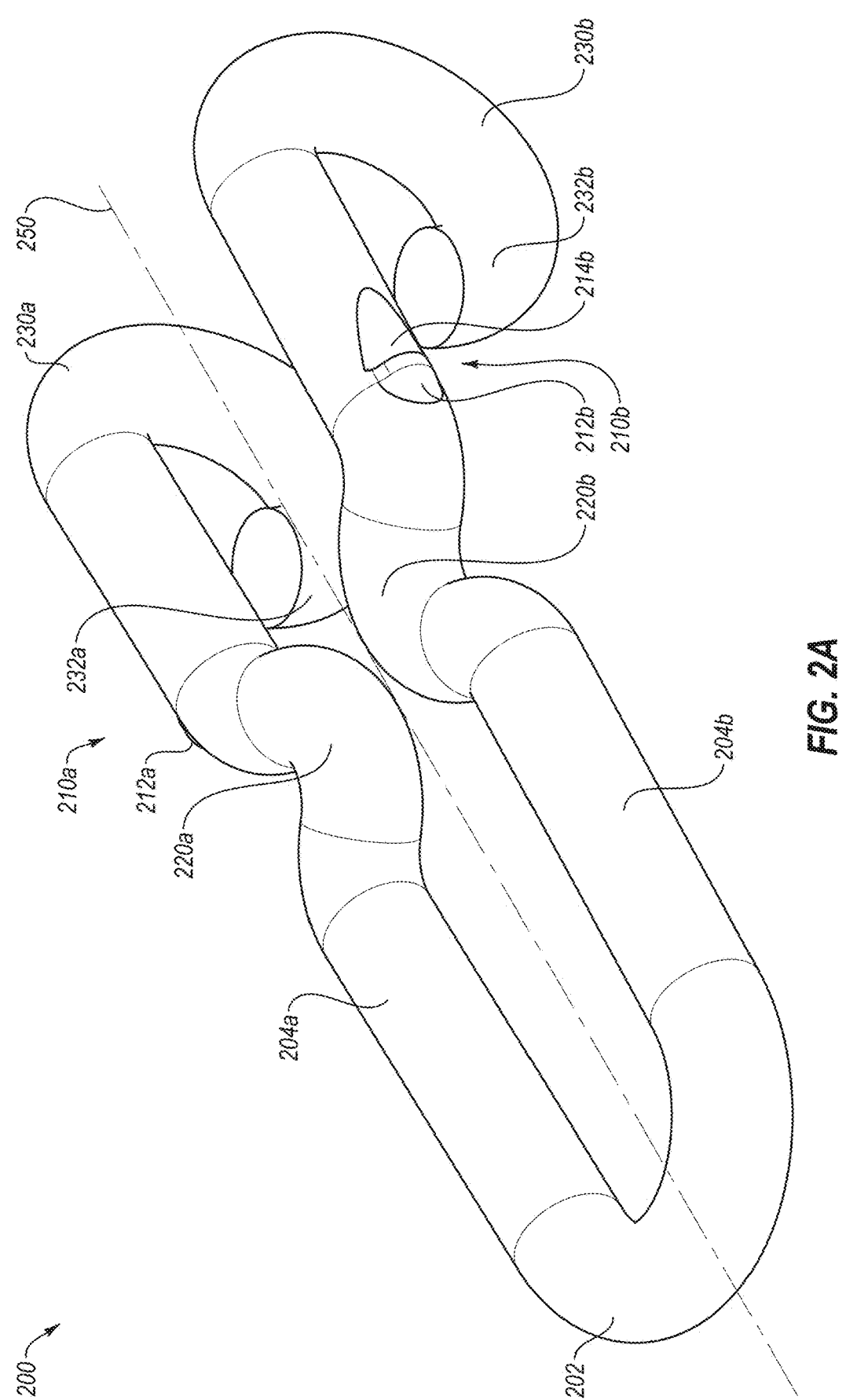
FIGS. 2A-2B illustrate a first exemplary mounting pin.
Figure 2B:
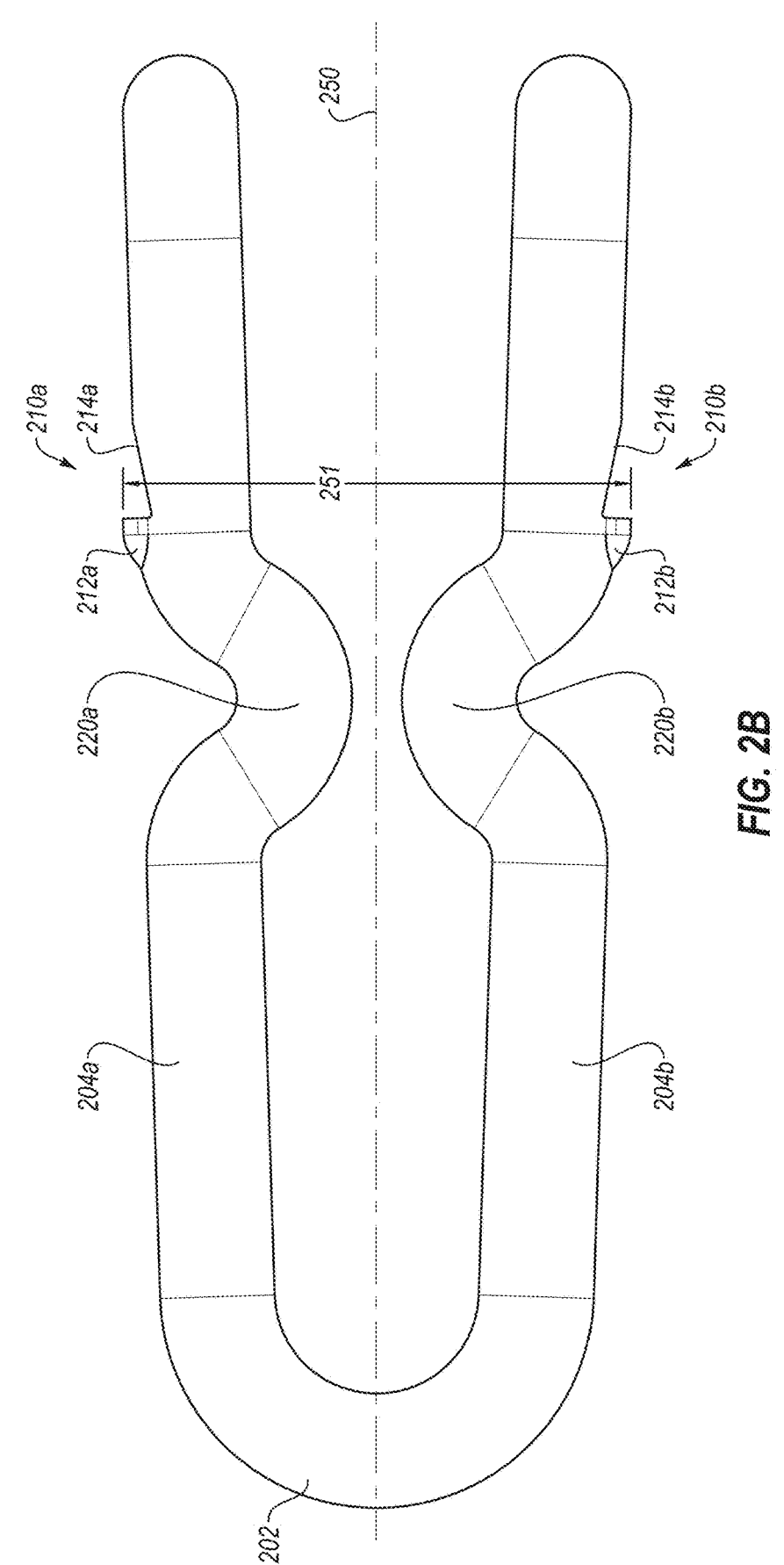
Figure 3A:
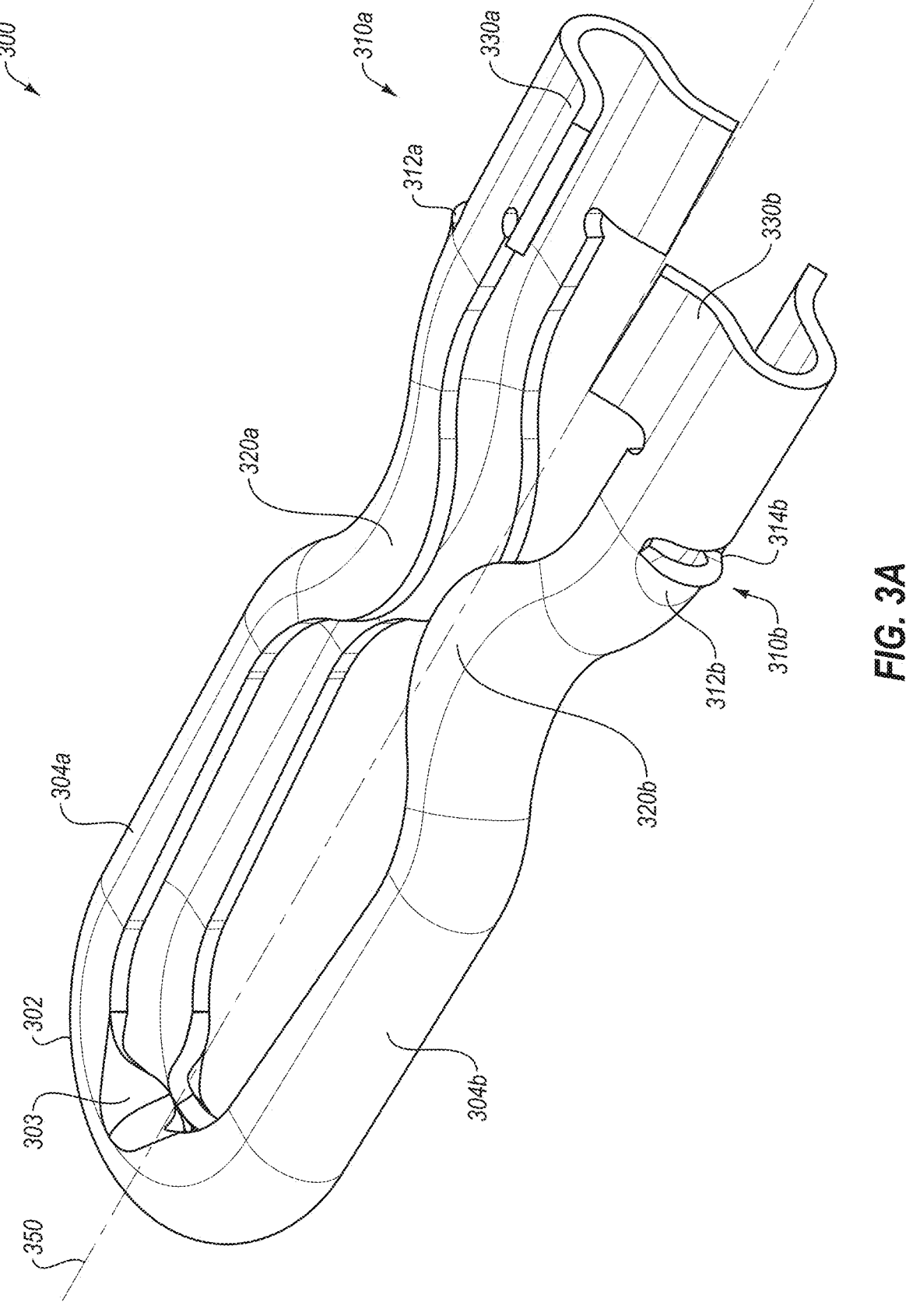
FIGS. 3A-3B illustrate a second exemplary mounting pin.
Figure 3B:
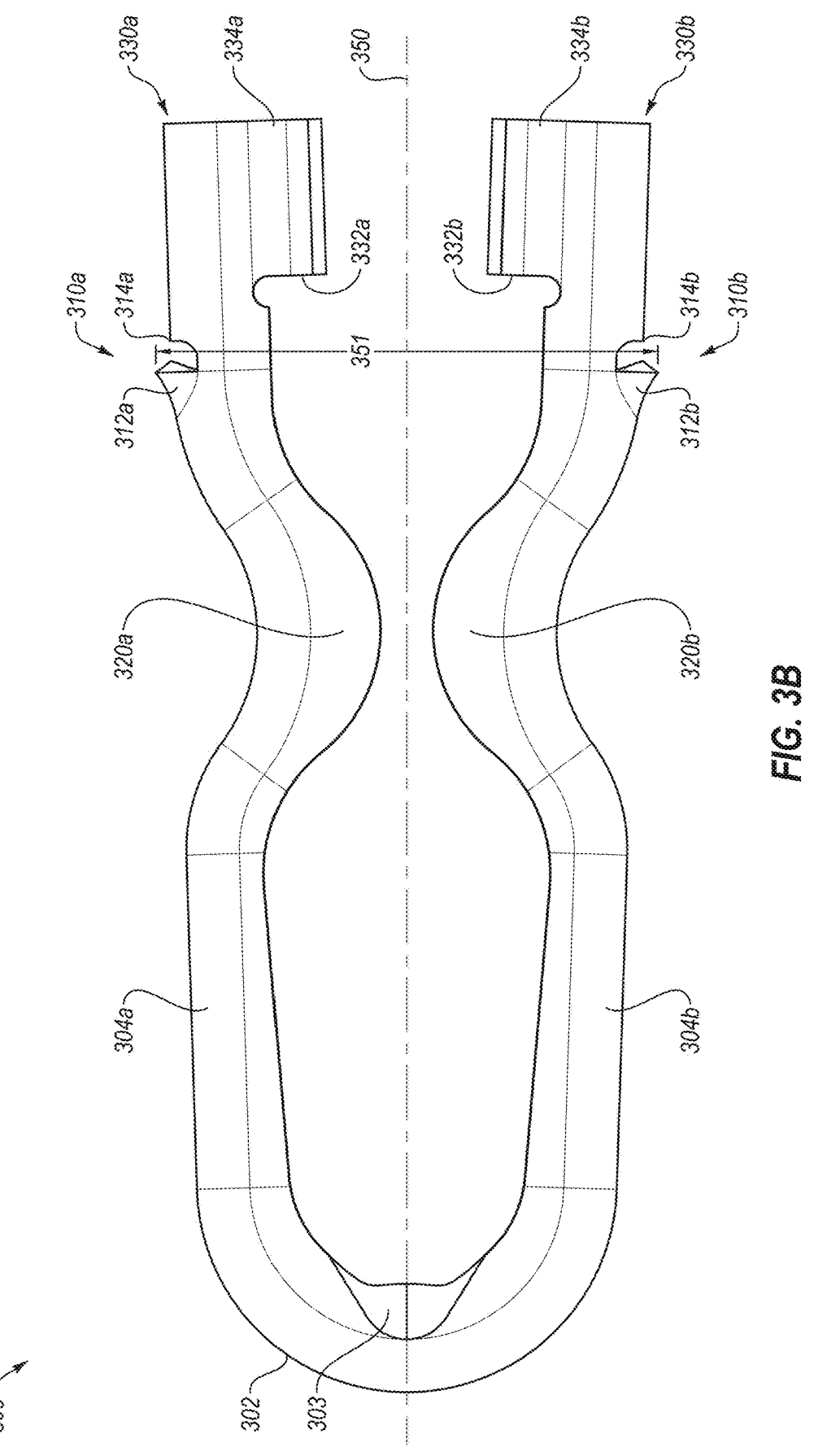

A wide variety of different mounting pins or clips may be inserted into the mounting pin openings 116a and 158a to secure the module rail 114a to the support structure 102. In the PV module mounting system 100, a pair of mounting clips 200 and a pair of mounting clips 300 are used to secure the module rail 114a to the support structure 102. The mounting clips 200 are illustrated in FIGS. 2A-2B and are described in more detail hereafter in connection with FIGS. 2A-2B. The mounting clips 300 are illustrated in FIGS. 3A-3B and are described in more detail in connection with FIGS. 3A-3B. Additional embodiments of possible mounting pins are provided in FIGS. 4-7.

Figure 1B:
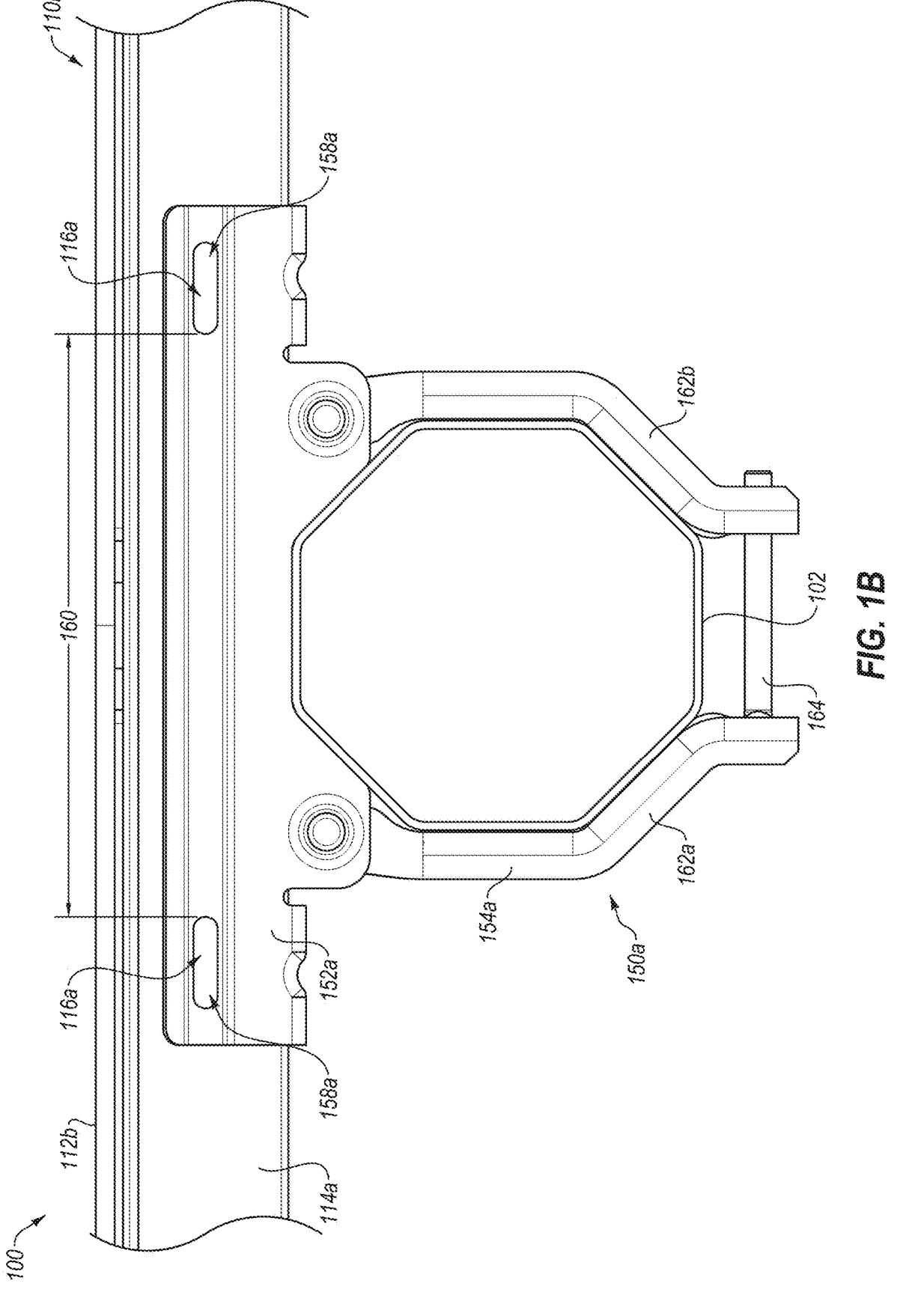

FIG. 1B illustrates a side-sectional view of a portion of the PV module mounting system 100 of FIG. 1. Specifically, FIG. 1B illustrates the support structure 102 and the PV module 110b, including the solar panel 112b and the module rail 114a. FIG. 1B also illustrates the module mounting assembly 150a, including the mounting bracket 152a and the clamp 154a. The module mounting assembly 150a in FIG. 2 lacks the mounting clips 200 and 300. Rather, the mounting pin openings 116a in the module rail 114a and the mounting pin openings 158a in the mounting bracket 152a are shown. As can be seen, the mounting pin openings 116*a* and 158*a* are in alignment and are consistent in size and shape (oval). In some embodiments, a distance 160 between the pin openings 116*a* and the distance 160 between the pin openings 158*a* may be between approximately one hundred millimeters (mm) and six hundred mm.

The clamp 154*a* may circumscribe all or a portion of the support structure. For example, the clamp 154*a* includes arms 162*a* and 162*b* that are pivotally secured to the mounting bracket 152*a*. A bolt 164 may secure bottom portions of the arms 162*a* and 162*b* together to compress the support structure 102 between the arms 162*a* and 162*b*. When installing the module mounting assembly 150*a* to the support structure 102, the bolt 164 may be removed and the arms 162*a* and 162*b* may be extend away from each other and around the support structure 102. Once around the support structure 102, the bolt 164 may be inserted and tightened to compress the support structure 102 between the arms 162*a* and 162*b*.

Figure 1C:
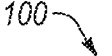

FIG. 1C illustrates another side-sectional view of the PV module mounting system 100 that shows a portion of the PV module 110*b* including the solar panel 112*b* and the module rail 114*a*, the support structure 102, and the module mounting assembly 150*a* including the clamp 154*a*, the mounting bracket 152*a*, and the mounting clip 300 in an installed state.

Figure 1D:
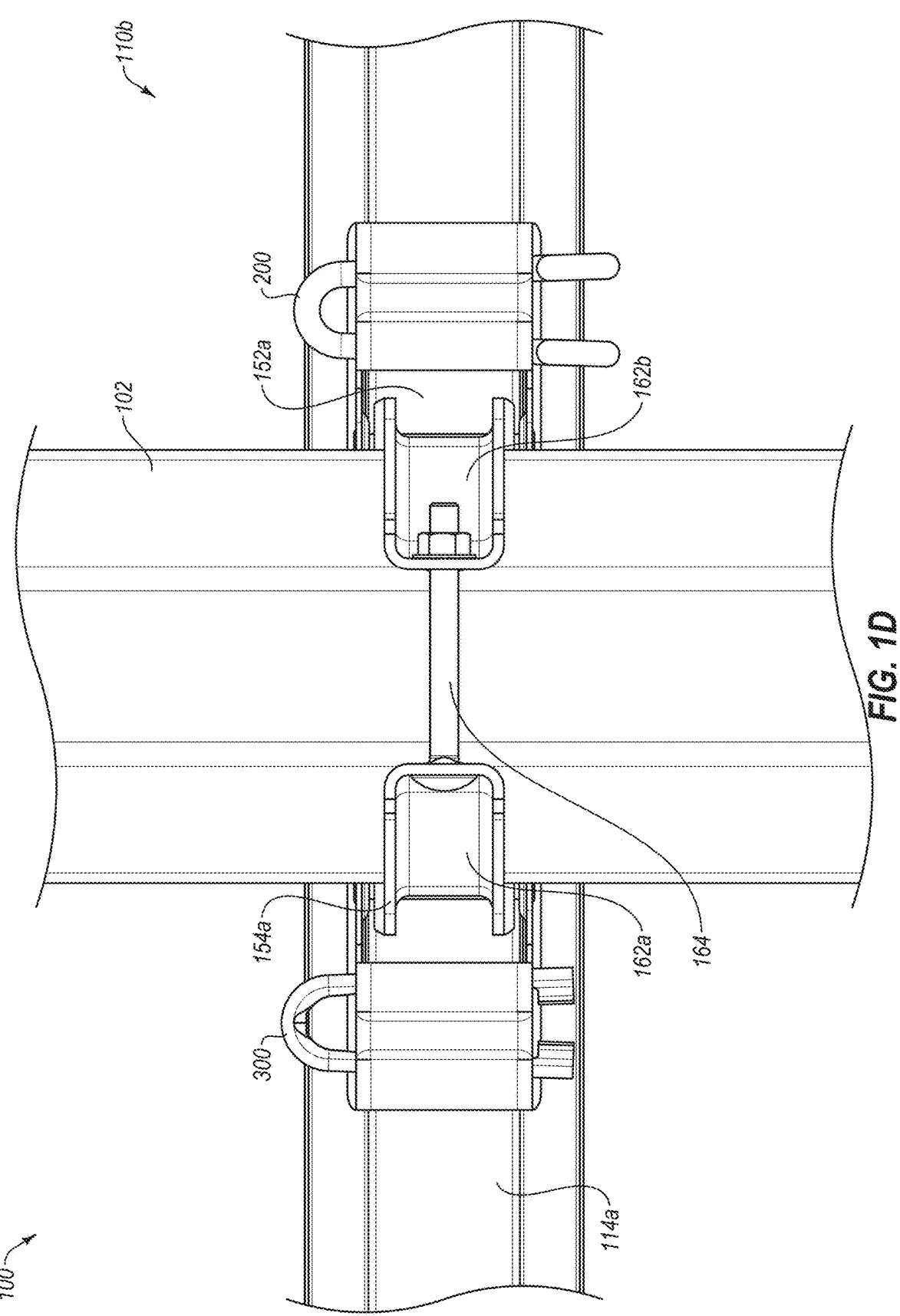

As can be seen in FIG. 1C, the mounting bracket 152*a* has a cross sectional U shape that defines an opening. In some embodiments, a distance between the sides of the mounting bracket 152*a* may be equal to or between forty-two mm and seventy-five mm. During installation, a portion of the module rail 114*a* may be inserted into the opening defined by the mounting bracket 152*a*. The module rail 114*a* may mate with the opening defined by the mounting bracket 152*a* such that a portion of the module rail 114*a* is seated within this opening. In addition, during installation, the module rail 114*a* may be positioned relative to the mounting bracket 152*a* to position the clip openings 158*a* in the mounting bracket 152*a* proximate to the clip openings 116*a* in the module rail 114*a*. FIG. 1D illustrates a bottom sectional view of the system 100 with mounting clips 200 and 300 in an installed state.

While the PV module mounting system 100 uses mounting pins 200 and 300 to secure the PV module 110*b* to the support structure 102, any number of different mounting pins or clips may be used to secure the PV module 110*b* to the support structure 102. FIGS. 2-7 illustrate several examples of possible mounting pins that could be used in the system 100, including the mounting clips 200 and 300 that are shown in the system 100.

FIGS. 2A-2B illustrate the mounting clip 200. Different views of the mounting clip 200 are provided in FIGS. 2A-2B. For example, FIG. 2A illustrates a perspective view of the mounting clip 200 and FIG. 2B illustrates a top view of the mounting clip 200.

The mounting clip 200 includes a connecting component 202, a first arm 204*a*, and a second arm 204*b*. The connecting component 202 is connected to the first arm 204*a* and the second arm 204*b*. The first arm 204*a* and the second arm 204*b* extend from the connecting component 202 in a direction that follows a longitudinal axis 250 of the mounting clip 200.

The first arm 204*a* includes a first retention component 210*a*. The first retention component 210*a* includes a first tab 212*a* and a first slot 214*a* (shown in FIG. 2B). The first tab 212*a* is a protruding feature that extends away from the surface of the first arm 204*a*. The first slot 214*a* is a recessed feature in the surface of the first arm 204*a* that is positioned next to the first tab 212*a*. Similar features are included on the second arm 204*b*. Specifically, the second arm 204*b* includes a second retention component 210*b*. The second retention component 210*b* includes a second tab 212*b* and a second slot 214*b*. The second tab 212*b* is a protruding feature that extends away from the surface of the second arm 204*b*. The second slot 214*b* is a recessed feature in the surface of the second arm 204*b* that is positioned next to the second tab 212*b*.

The first and second arms 204*a* and 204*b* also include first and second compression limiting components 220*a* and 220*b*, respectively. The first and second compression limiting components 220*a* and 220*b* include curved portions of the first and second arms 204*a* and 204*b* that extend inward toward each other. The first and second arms 204*a* and 204*b* further include first and second stop components 230*a* and 230*b*, respectively. The first and second stop components 230*a* and 230*b* are physically positioned at distal ends, opposite the connecting component 202, of the first and second arms 204*a* and 204*b*.

The connecting component 202 may be elastically deformable such that a distance between the first and second arms 204*a* and 204*b* may be selectively adjustable by applying a pressure to the first and second arms 204*a* and 204*b*. In an uninstalled state, or when the mounting clip 200 is not positioned within a mounting pin opening in a module rail or a mounting pin opening in a mounting bracket, the mounting clip 200 may have a width 251 (shown in FIG. 2B) between first and second tabs 212*a* and 212*b* that is greater than a width of one or both of a mounting pin opening in a module rail and a mounting pin opening in a mounting bracket. For example, with reference to the mounting pin opening 116*a* in the module rail 114*a* and the mounting pin opening 158*a* in the mounting bracket 152*a* of the PV module mounting system 100, the width 251 of the mounting clip 200 in an uninstalled state is greater than the length of the mounting pin openings 116*a* and 158*a*. Due to the width 251 of the mounting clip 200 being greater than the length of the mounting pin openings 116*a* and 158*a* in the uninstalled state, an increased an amount of mechanical force may be applied by the mounting clip 200 to one or both of the mounting pin openings 116*a* and 158*a*.

During installation, a tool or other item (such as a hand of an installer) may apply a compressive force to the first and second arms 204*a* and 204*b*. For example, the compressive force may be applied at the distal ends of the first and second arms 204*a* and 204*b*. As another example, the compressive force may be applied to the first and second stop components 230*a* and 230*b*. The compressive force may cause the first and second arms 204*a* and 204*b* to move inwards towards the longitudinal axis 250. In addition, the compressive force may cause the connecting component 202 to deform to apply or load a spring force to the first and second arms 204*a* and 204*b*. In some embodiments, the compressive force may cause the first and second arms 204*a* and 204*b* to move inward towards the longitudinal axis 250 until the compressive force equals the spring force. Applying a compressive force may thus cause the mounting clip 200 to transition from an uninstalled state to a compressed state in which the width 251 of the mounting clip 200 is less than the width 251 in the uninstalled state.

In some embodiments, the first and second compression limiting components 220*a* and 220*b* may limit an amount of compression of the mounting clip 200. For example, the compressive force may cause the first and second arms 204*a* and 204*b* to move inward towards the longitudinal axis 250 until the first compression limiting component 220*a* and the second compression limiting component 220*b* physically contact each other. The first compression limiting component 220*a* and the second compression limiting component 220*b* may prevent the mounting clip 200 from being over compressed in a direction along a lateral axis (perpendicular to the longitudinal axis 250) of the mounting clip 200. In addition, the first and second compression limiting components 220*a* and 220*b* may prevent the connecting component 202 from yielding and permanently deforming.

In the compressed state, the distance between the first and second tabs 212*a* and 212*b* may be reduced to be less than the length of one or both of a mounting pin opening in a module rail and a mounting pin opening in a mounting bracket. For example, in the PV module mounting system 100 where a pair of mounting clips 200 are installed within the mounting pin openings 116*a* and 158*a*, the width 251 of the mounting clip 200 in the compressed state would be less than the length of the mounting pin openings 116*a* and 158*a*. Thus, in the compressed state, the mounting clip 200 may be freely inserted into the mounting pin openings 116*a* and 158*a*. The mounting clips 200 may be inserted into these openings until the first and/or second stop components 230*a* and/or 230*b* physically contact or engage with the mounting bracket 152*a*. The first and second stop components 230*a* and 230*b* may limit an insertion depth of the mounting clip 200. For example, a surface 232*a* of the first stop component 230*a* and/or a surface 232*b* of the second stop component 230*b* may physically contact an external surface a mounting bracket when the mounting clip 200 is in an installed state.

After the mounting clip 200 is inserted into a mounting pin opening in a module rail and a mounting pin opening in a mounting bracket, the compressive force may be released, which may cause the mounting clip 200 to transition to the installed state. In the installed state, the connecting component 202 may apply a spring force to the first and second arms 204*a* and 204*b* in directions away from the longitudinal axis 250. The spring force may cause the first and second arms 204*a* and 204*b* to move away from the longitudinal axis 250 and engage with one or both of the module rail and the mounting bracket. With this outward spring force, the first and second retention components 210*a* and 210*b* may prevent the mounting clip 200 from disengaging from within the clip openings.

In some embodiments, the first and second retention components 210*a* and 210*b* may interface with an inside surface of a module rail to prevent the mounting clip 200 from backing out of the openings after installation. In these and other embodiments, the first and second tabs 212*a* and 212*b* may engage or contact the mounting bracket, the module rail, or some combination thereof.

In the installed state, the first and second retention components 210*a* and 210*b* may prevent movement of the mounting clip 200 relative to the mounting bracket and the module rail in a direction away from the connecting component 202 along the longitudinal axis 250. Further, in the installed state, the spring force may prevent or restrain movement of a mounting bracket and a solar panel in directions along the lateral axis (perpendicular to the longitudinal axis 250) of the mounting clip 200.

In some embodiments, the first tab 212*a* may be positioned relative the first stop component 230*a* to prevent backing out of the mounting clip 200. In these and other embodiments, the second tab 212*b* may be positioned relative the second stop component 230*b* to prevent backing out of the mounting clip 200. A distance between the first tab 212*a* and the first stop component 230*a* may be based on a thickness of a sidewall of a module rail, a mounting bracket, or some combination thereof. The distance between the first tab 212*a* and the first stop component 230*a* may cause the first retention component 210*a* and the first stop component 230*a* to prevent movement of the mounting clip 200 in a direction along the longitudinal axis 250 when installed. A distance between the second tab 212*b* and the second stop component 230*b* may be based on a thickness of the sidewall of the module rail, the mounting bracket, or some combination thereof. The distance between the second tab 212*b* and the second stop component 230*b* may cause the second retention component 210*b* and the second stop component 230*b* to prevent movement of the mounting clip 200 in the direction along the longitudinal axis 250 when installed.

In some embodiments, the spring force applied by the connecting component 202 in the installed state may be equal to or between one pound of force and one hundred pounds of force. The spring force applied by the connecting component 202 may account for external forces applied to a solar tracking system to prevent movement of a mounting bracket and a solar panel in directions along the lateral axis (perpendicular to the longitudinal axis 250). For example, the spring force may account for forces applied to a PV module mounting system by wind, snow, rain, gravity, or any other appropriate force. In some embodiments, the spring force may be sufficient to prevent movement of the mounting bracket relative to the solar panel but small enough to permit the installer to compress the mounting clip 200 by hand.

To remove or uninstall the mounting clip 200, a compressive force may again be applied to the distal ends of the first and second arms 204*a* and 204*b* to cause the first and second arms 204*a* and 204*b* to move inwards towards the longitudinal axis 250 to cause the mounting clip 200 to transition to the compressed state. In the compressed state, the mounting clip 200 may be freely removed from mounting clip openings.

In some embodiments, the first and second arms 204*a* and 204*b*, the connecting component 202, or some combination thereof may include a single unibody piece of round rod material. In these and other embodiments, the round rod material may include a circular cross sectional profile. A height of the mounting clip 200 may be slightly less than a height of the clip openings.

In some embodiments, the mounting clip 200 may be formed using a wire forming device. In these and other embodiments, the mounting clip 200 may be formed without using specialized tools or specialized training. In these and other embodiments, the mounting clip 200 may include a spring clip. In some embodiments, the first retention component 210*a* may include only the first tab 212*a* and not the first slot 214*a*. In these and other embodiments, the second retention component 210*b* may include only the second tab 212*a* and not the second slot 214*b*.

In some embodiments, the first and second stop components 230*a* and 230*b* may form a semi-circles. In other embodiments, the first and second stop components 230*a* and 230*b* may form different shapes. For example, the first and second stop components 230*a* and 230*b* may form rectangles, squares, triangles, half-circles, hexagons, or any other appropriate shape. The first and second stop components 230*a* and 230*b* may further include tool interfaces. For examples, the first and second stop components 230*a* and 230*b* may define tool cutouts configured to receive a tool to compress the mounting clip 200.

In some embodiments, in order to facilitate positioning of the mounting clip 200 within mounting clip openings, all or part of an exterior surface of the mounting clip 200 may include a lubricant coating. This lubricant coating may be any type of wet or dry lubricant, including wax, oil, grease, silicon, graphite, etc. In some embodiments, an entire exterior surface of the mounting clip 200 may have the lubricant coating. In other embodiments, only the portions of the mounting clip 200 that contact sides of the mounting holes during installation may include the lubricant coating.

FIGS. 3A-3B illustrate the mounting clip 300. Different views of the mounting clip 300 are provided in FIGS. 3A-3B. For example, FIG. 3A illustrates a perspective view of the mounting clip 300 and FIG. 3B illustrates a top view of the mounting clip 300.

The mounting clip 300 includes a connecting component 302, a first arm 304a, and a second arm 304b. The connecting component 302 is connected to the first arm 304a and the second arm 304b. The first arm 304a and the second arm 304b may extend from the connecting component 302 in a direction that follows a longitudinal axis 350 of the mounting clip 300.

The first arm 304a includes a first retention component 310a. The first retention component 310a includes a first tab 312a and a first slot 314a (shown in FIG. 3B). The first tab 312a is a protruding feature that extends away from the surface of the first arm 304a. The first slot 314a is a recessed feature in the surface of the first arm 304a that is positioned next to the first tab 312a. Similar features are included on the second arm 304b. Specifically, the second arm 304b includes a second retention component 310b. The second retention component 310b includes a second tab 312b and a second slot 314b. The second tab 312b is a protruding feature that extends away from the surface of the second arm 304b. The second slot 314b is a recessed feature in the surface of the second arm 304b that is positioned next to the second tab 312b.

The first and second arms 304a and 304b also include first and second compression limiting components 320a and 320b, respectively. The first and second compression limiting components 320a and 320b include curved portions of the first and second arms 304a and 304b that extend inward toward each other. The first and second arms 304a and 304b further include first and second stop components 330a and 330b, respectively. The first and second stop components 330a and 330b are physically positioned at distal ends, opposite the connecting component 302, of the first and second arms 304a and 304b.

The connecting component 302 may be elastically deformable such that a distance between the first and second arms 304a and 304b may be selectively adjustable by applying a pressure to the first and second arms 304a and 304b. The connecting component 302 includes a pinched edge 303 that facilitates deformation of the connecting component 302. In an uninstalled state, or when the mounting clip 300 is not positioned within a mounting pin opening in a module rail or a mounting pin opening in a mounting bracket, the mounting clip 300 may have a width 351 (shown in FIG. 3B) between first and second tabs 312a and 312b that is greater than a width of one or both of a mounting pin opening in a module rail and a mounting pin opening in a mounting bracket. For example, with reference to the mounting pin opening 116a in the module rail 114a and the mounting pin opening 158a in the mounting bracket 152a of the PV module mounting system 100, the width 351 of the mounting clip 300 in an uninstalled state is greater than the length of the mounting pin openings 116a and 158a. Due to the width 351 of the mounting clip 300 being greater than the length of the mounting pin openings 116a and 158a in the uninstalled state, an increased an amount of mechanical force may be applied by the mounting clip 300 to one or both of the mounting pin openings 116a and 158a.

During installation, a tool or other item (such as a hand of an installer) may apply a compressive force to the first and second arms 304a and 304b. For example, the compressive force may be applied at the distal ends of the first and second arms 304a and 304b. As another example, the compressive force may be applied to the first and second stop components 330a and 330b. The compressive force may cause the first and second arms 304a and 304b to move inwards towards the longitudinal axis 350. In addition, the compressive force may cause the connecting component 302 to deform to apply or load a spring force to the first and second arms 304a and 304b. In some embodiments, the compressive force may cause the first and second arms 304a and 304b to move inward towards the longitudinal axis 350 until the compressive force equals the spring force. Applying a compressive force may thus cause the mounting clip 300 to transition from an uninstalled state to a compressed state in which the width 351 of the mounting clip 300 is less than the width 351 in the uninstalled state.

In some embodiments, the first and second compression limiting components 320a and 320b may limit an amount of compression of the mounting clip 300. For example, the compressive force may cause the first and second arms 304a and 304b to move inward towards the longitudinal axis 350 until the first compression limiting component 320a and the second compression limiting component 320b physically contact each other. The first compression limiting component 320a and the second compression limiting component 320b may prevent the mounting clip 300 from being over compressed in a direction along a lateral axis (perpendicular to the longitudinal axis 350) of the mounting clip 300. In addition, the first and second compression limiting components 320a and 320b may prevent the connecting component 302 from yielding and permanently deforming.

In the compressed state, the distance between the first and second tabs 312a and 312b may be reduced to be less than the length of one or both of a mounting pin opening in a module rail and a mounting pin opening in a mounting bracket. For example, in the PV module mounting system 100 where a pair of mounting clips 300 are installed within the mounting pin openings 116a and 158a, the width 351 of the mounting clip 300 in the compressed state would be less than the length of the mounting pin openings 116a and 158a. Thus, in the compressed state, the mounting clip 300 may be freely inserted into the mounting pin openings 116a and 158a. The mounting clips 300 may be inserted into these openings until the first and/or second stop components 330a and/or 330b physically contact or engage with the mounting bracket 152a. The first and second stop components 330a and 330b may limit an insertion depth of the mounting clip 300. For example, a surface 332a of the first stop component 330a and/or a surface 332b of the second stop component 330b may physically contact an external surface a mounting bracket when the mounting clip 300 is in an installed state.

After the mounting clip 300 is inserted into a mounting pin opening in a module rail and a mounting pin opening in a mounting bracket, the compressive force may be released, which may cause the mounting clip 300 to transition to the installed state. In the installed state, the connecting component 302 may apply a spring force to the first and second arms 304a and 304b in directions away from the longitudinal axis 350. The spring force may cause the first and second arms 304a and 304b to move away from the longitudinal axis 350 and engage with one or both of the module rail and the mounting bracket. With this outward spring force, the first and second retention components 310a and 310b may prevent the mounting clip 300 from disengaging from within the clip openings.

In some embodiments, the first and second retention components 310a and 310b may interface with an inside surface of a module rail to prevent the mounting clip 300 from backing out of the openings after installation. In these and other embodiments, the first and second tabs 312a and 312b may engage or contact the mounting bracket, the module rail, or some combination thereof.

In the installed state, the first and second retention components 310a and 310b may prevent movement of the mounting clip 300 relative to the mounting bracket and the module rail in a direction away from the connecting component 302 along the longitudinal axis 350. Further, in the installed state, the spring force may prevent or restrain movement of a mounting bracket and a solar panel in directions along the lateral axis (perpendicular to the longitudinal axis 350) of the mounting clip 300.

In some embodiments, the first tab 312a may be positioned relative the first stop component 330a to prevent backing out of the mounting clip 300. In these and other embodiments, the second tab 312b may be positioned relative the second stop component 330b to prevent backing out of the mounting clip 300. A distance between the first tab 312a and the first stop component 330a may be based on a thickness of a sidewall of a module rail, a mounting bracket, or some combination thereof. The distance between the first tab 312a and the first stop component 330a may cause the first retention component 310a and the first stop component 330a to prevent movement of the mounting clip 300 in a direction along the longitudinal axis 350 when installed. A distance between the second tab 312b and the second stop component 330b may be based on a thickness of the sidewall of the module rail, the mounting bracket, or some combination thereof. The distance between the second tab 312b and the second stop component 330b may cause the second retention component 310b and the second stop component 330b to prevent movement of the mounting clip 300 in the direction along the longitudinal axis 350 when installed.

In some embodiments, the spring force applied by the connecting component 302 in the installed state may be equal to or between one pound of force and one hundred pounds of force. The spring force applied by the connecting component 302 may account for external forces applied to a solar tracking system to prevent movement of a mounting bracket and a solar panel in directions along the lateral axis (perpendicular to the longitudinal axis 350). For example, the spring force may account for forces applied to a PV module mounting system by wind, snow, rain, gravity, or any other appropriate force. In some embodiments, the spring force may be sufficient to prevent movement of the mounting bracket relative to the solar panel but small enough to permit the installer to compress the mounting clip 300 by hand.

To remove or uninstall the mounting clip 300, a compressive force may again be applied to the distal ends of the first and second arms 304a and 304b to cause the first and second arms 304a and 304b to move inwards towards the longitudinal axis 350 to cause the mounting clip 300 to transition to the compressed state. In the compressed state, the mounting clip 300 may be freely removed from mounting clip openings.

In some embodiments, the first and second arms 304a and 304b, the connecting component 302, or some combination thereof may include a single unibody piece of material. In these and other embodiments, the material may include a C-shaped cross sectional profile. A height of the mounting clip 200 may be slightly less than a height of the clip openings.

A depth of the channel in the C-shaped cross sectional profile of the mounting clip 300 may vary throughout the mounting clip 300. The depth may vary to compensate for different forces that may be applied to the mounting clip 300. The depth may vary to fine tune the spring force of the mounting clip 300 at different positions along the first and second arms 304a and 304b. A thickness of the material may also vary or be adjusted to compensate for different forces that may be applied to the mounting clip 300. The material of the mounting clip 300 may include sheet metal, sheet stock, or any other appropriate material.

In some embodiments, the mounting clip 300 may be formed using a stamping process, a bending process, or some combination thereof. In these and other embodiments, the mounting clip 300 may include a spring clip. In some embodiments, the first retention component 310a may include only the first tab 312a and not the first slot 314a. In these and other embodiments, the second retention component 310b may include only the second tab 312a and not the second slot 314b.

In some embodiments, the first and second stop components 330a and 330b may include flanges 334a and 334b, respectively. The flanges 334a and 334b may alternatively be called wings. In some embodiments, the flanges 334a may extend diagonally away from the first arm 304a generally toward the longitudinal axis 350. In these and other embodiments, the flanges 334a may extend away from the first arm 304a and away from a transverse plane of the mounting clip 300. The transverse plane may include a flat plane that extends along the longitudinal axis 350 and the lateral axis (perpendicular to the longitudinal axis 350) of the mounting clip 300. For example, the top view illustrated in FIG. 3B is perpendicular to the transverse plane of the mounting clip 300. In some embodiments, the flanges 334a may extend at an angle equal to or between thirty degrees and ninety degrees. In some embodiments, the flanges 334b may extend diagonally away from the second arm 304b generally toward the longitudinal axis 350. In these other embodiments, the flanges 334b may extend away from the second arm 304b and away from the transverse plane of the mounting clip 300. In some embodiments, the flanges 334b may extend at an angle equal to or between thirty degrees and ninety degrees.

The first and second stop components 330a and 330b may further include tool interfaces. For examples, the first and second stop components 330a and 330b may define tool cutouts configured to receive a tool to compress the mounting clip 300.

In some embodiments, in order to facilitate positioning of the mounting clip 300 within mounting clip openings, all or part of an exterior surface of the mounting clip 300 may include a lubricant coating. This lubricant coating may be any type of wet or dry lubricant, including wax, oil, grease, silicon, graphite, etc. In some embodiments, an entire exterior surface of the mounting clip 300 may have the lubricant coating. In other embodiments, only the portions of the mounting clip 300 that contact sides of the mounting holes during installation may include the lubricant coating.

In some embodiments, the mounting clip 300 illustrated in FIGS. 3A-3B may be cheaper to produce compared to the mounting clip 200 illustrated in FIGS. 2A-2B due to use of less material. In addition, in these and other embodiments, the mounting clip 300 illustrated in FIGS. 3A-3B may provide more fine-tuned spring force compared to the mounting clip 200.

Figure 4A:
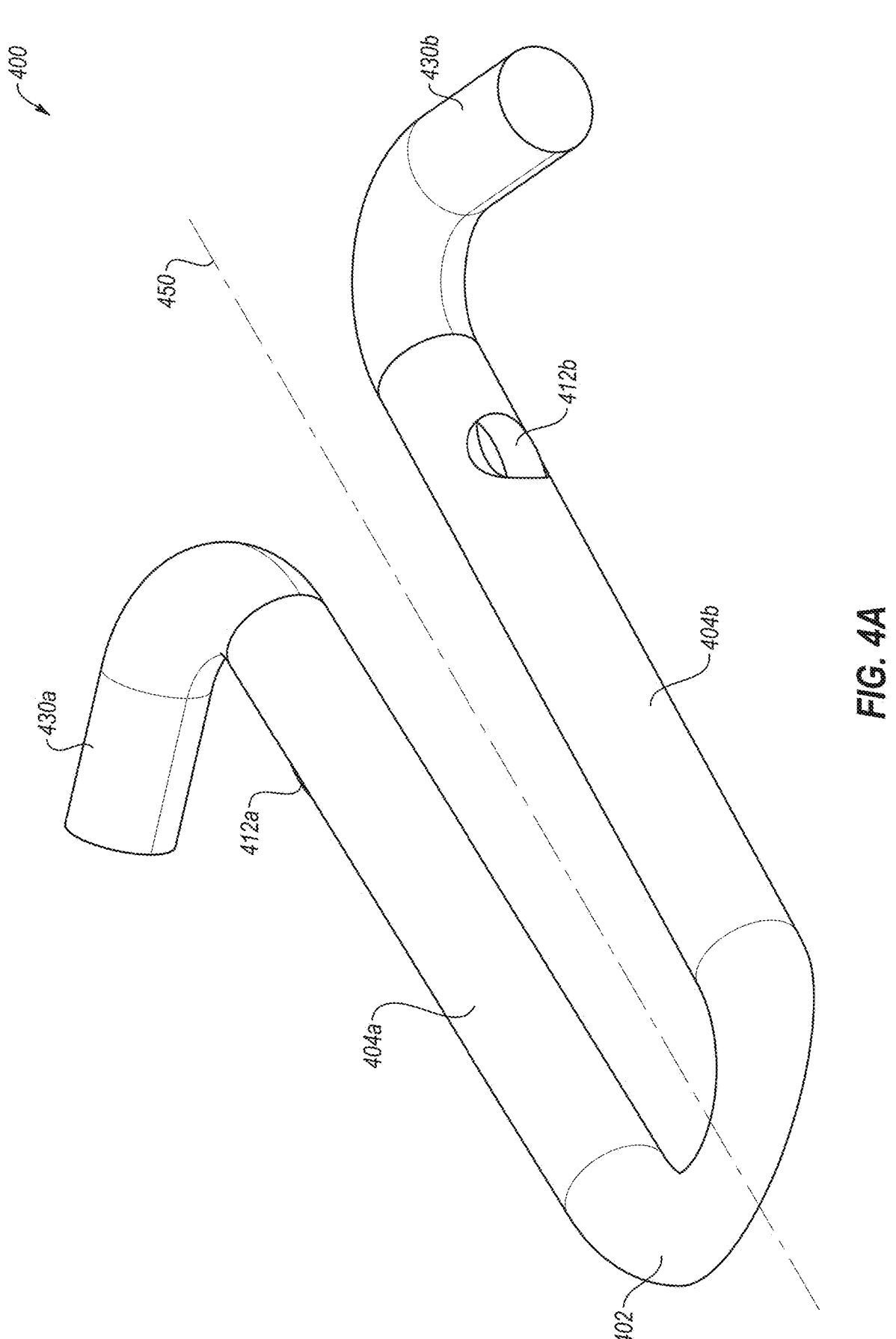
FIGS. 4A-4C illustrate a third exemplary mounting pin.
Figure 4B:
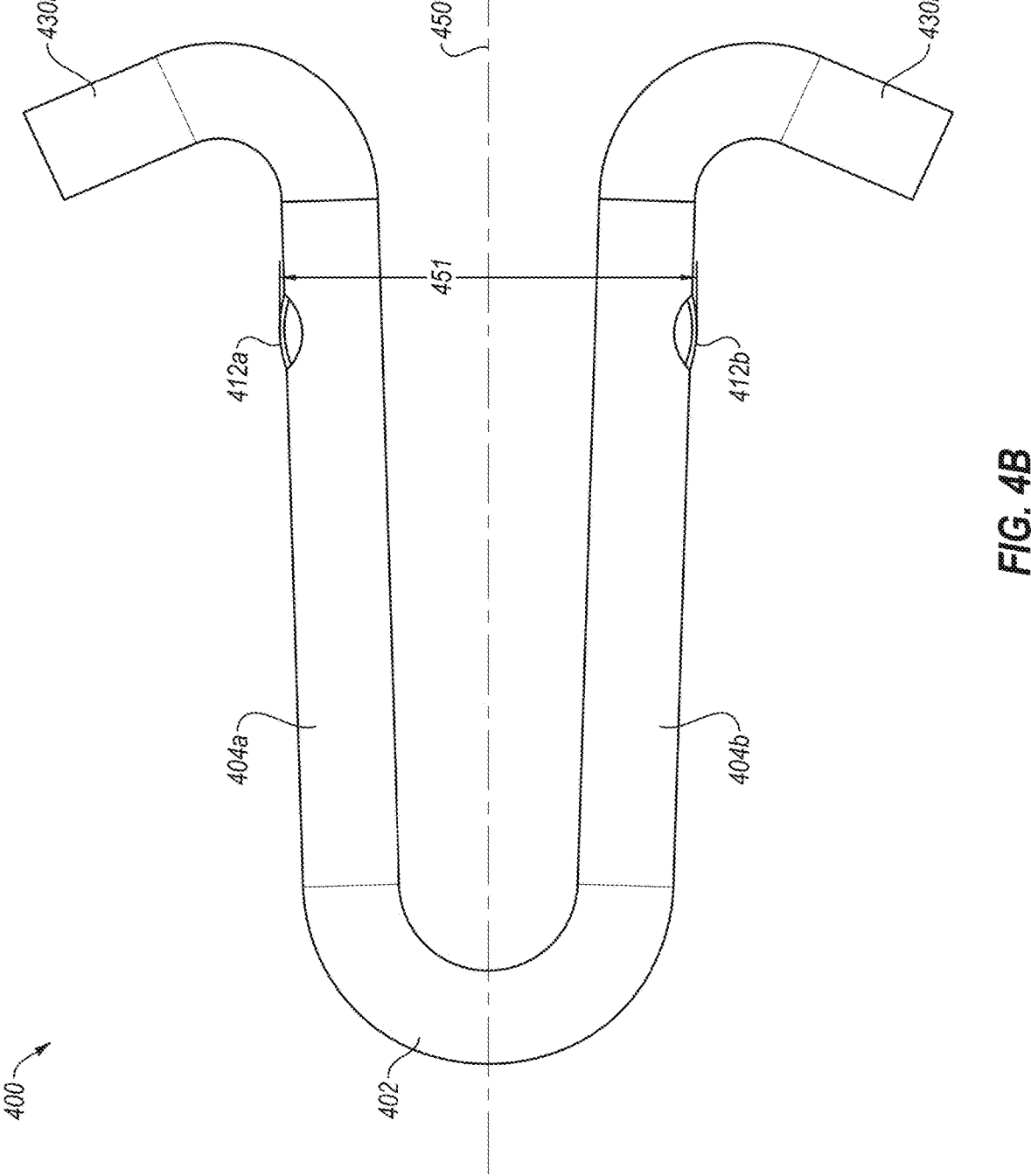
Figure 4C:
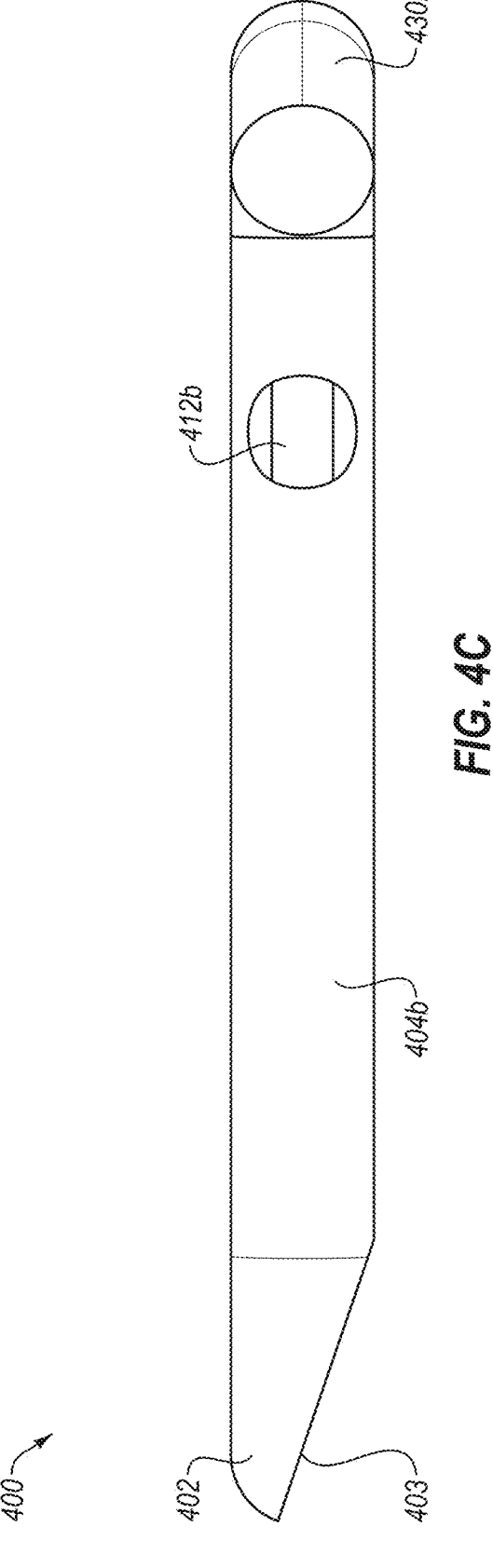

FIGS. 4A-4C illustrate another mounting pin that may be implemented in the PV module mounting system 100 of FIG. 1. Specifically, the mounting pin illustrated in FIGS. 4A-4C is a mounting clip 400. Different views of the mounting clip 400 are provided in FIGS. 4A-4C. For example, FIG. 4A illustrates a perspective view of the mounting clip 400, FIG. 4B illustrates a top view of the mounting clip 400, and FIG. 4C illustrates a side view of the mounting clip 400.

The mounting clip 400 includes a connecting component 402, a first arm 404a, and a second arm 404b. The connecting component 402 is connected to the first arm 404a and the second arm 404b. The first arm 404a and the second arm 404b extend from the connecting component 402 in a direction that follows a longitudinal axis 450 of the mounting clip 400.

The first arm 404a includes a first retention component that comprises a first tab 412a. The second arm 404b includes a second retention component that comprises a second tab 412b. The first and second tabs 412a and 412b are protruding features that extends away from the surface of the first and second arms 404a and 404b. The first tab 412a may be positioned proximate to a first stop component 430a. The second tab 412b may be positioned proximate to second stop component 430b. Unlike the retention components 210 and 310 of the mounting clips 200 and 300, the retention components of the mounting clip 400 lack slots. The first and second arms 404a and 404b also lack compression limiting components.

The connecting component 402 may be elastically deformable such that a distance between the first and second arms 404a and 404b may be selectively adjustable by applying a pressure to the first and second arms 404a and 404b. In an uninstalled state, or when the mounting clip 400 is not positioned within a mounting pin opening in a module rail or a mounting pin opening in a mounting bracket, the mounting clip 400 may have a width 451 (shown in FIG. 4B) between first and second tabs 412a and 412b that is greater than a width of one or both of a mounting pin opening in a module rail and a mounting pin opening in a mounting bracket.

During installation, a tool or other item (such as a hand of an installer) may apply a compressive force to the first and second arms 404a and 404b that may cause the first and second arms 404a and 404b to move inwards towards the longitudinal axis 450. The compressive force may cause the connecting component 402 to deform to apply or load a spring force to the first and second arms 404a and 404b. In some embodiments, the compressive force may cause the first and second arms 404a and 404b to move inward towards the longitudinal axis 450 until the compressive force equals the spring force. Applying a compressive force may thus cause the mounting clip 400 to transition from an uninstalled state to a compressed state in which the width 451 of the mounting clip 400 is less than the width 451 in the uninstalled state.

After the mounting clip 400 is inserted into a mounting pin opening in a module rail and a mounting pin opening in a mounting bracket, the compressive force may be released, which may cause the mounting clip 400 to transition to the installed state. In the installed state, the connecting component 402 may apply a spring force to the first and second arms 404a and 404b in directions away from the longitudinal axis 450. The spring force may cause the first and second arms 404a and 404b to move away from the longitudinal axis 450 and engage with one or both of the module rail and the mounting bracket. With this outward spring force, the first and second retention components 410a and 410b may prevent the mounting clip 400 from disengaging from within the clip openings.

To remove or uninstall the mounting clip 400, a compressive force may again be applied to the distal ends of the first and second arms 404a and 404b to cause the first and second arms 404a and 404b to move inwards towards the longitudinal axis 450 to cause the mounting clip 400 to transition to the compressed state. In the compressed state, the mounting clip 400 may be freely removed from mounting clip openings.

In some embodiments, in order to facilitate positioning of the mounting clip 400 within mounting clip openings, all or a portion of the connecting component 402 may have a ramped surface 403. The ramped surface 403 (shown in FIG. 4C) is on one side of the mounting clip 400 and may simplify inserting the mounting clip 400 into one or both of a mounting pin opening in a module rail and a mounting pin opening in a mounting bracket.

Figure 5A:
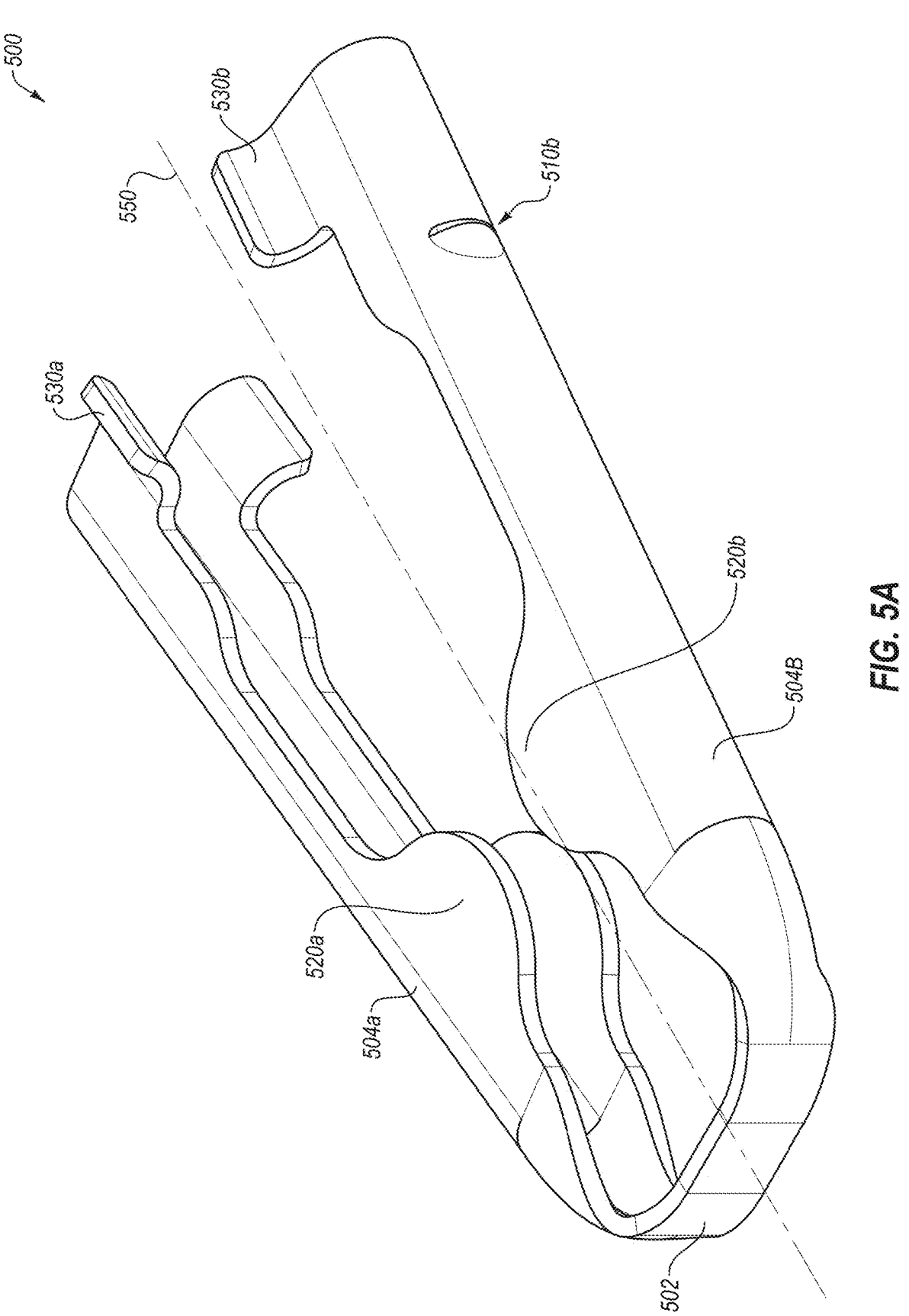
FIGS. 5A-5B illustrate a fourth exemplary mounting pin.
Figure 5B:
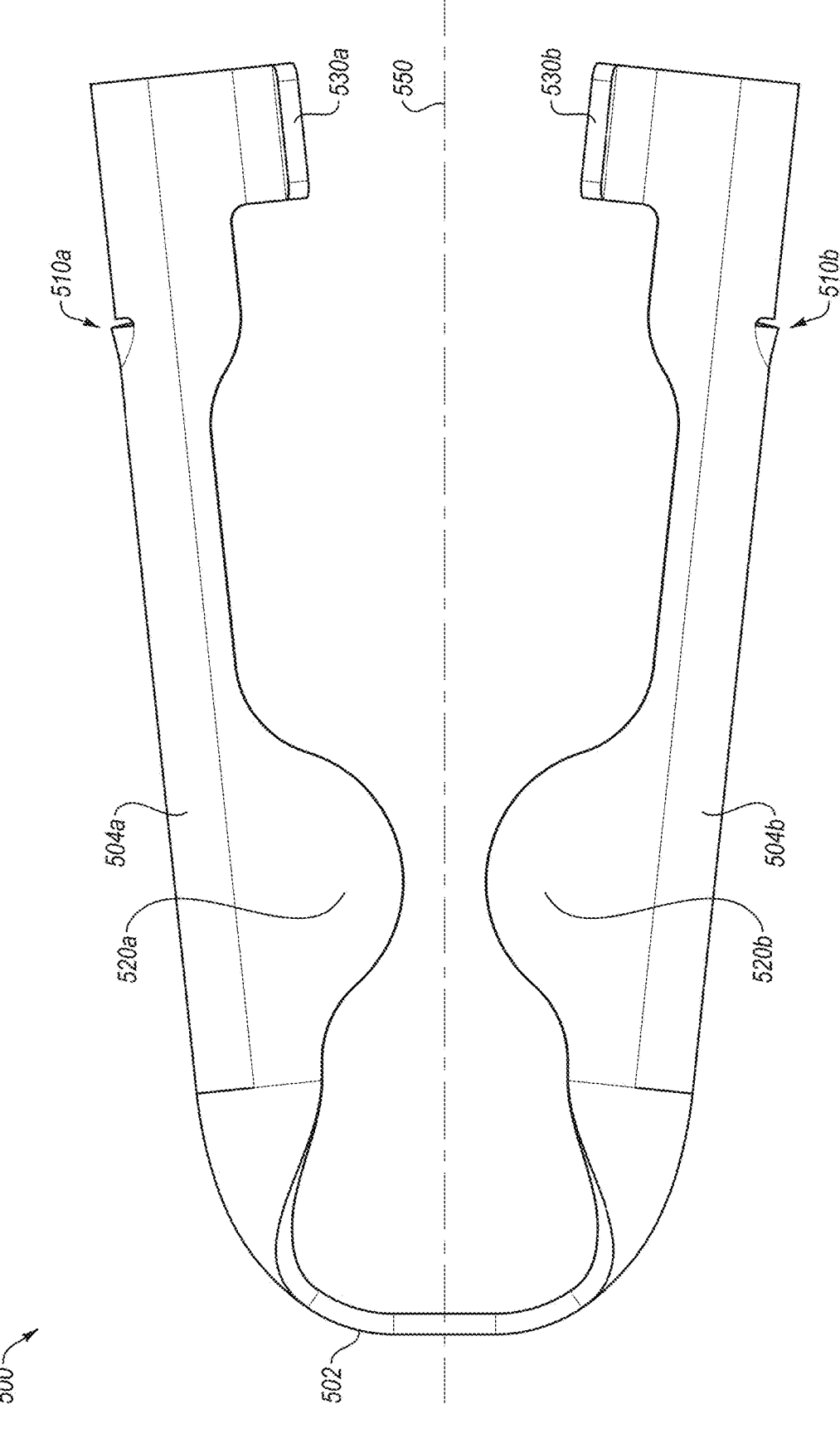

FIGS. 5A-5B illustrate another mounting pin that may be implemented in the PV module mounting system 100 of FIG. 1. Specifically, the mounting pin illustrated in FIGS. 5A-5B is a mounting clip 500. Different views of the mounting clip 500 are provided in FIGS. 5A-5B. For example, FIG. 5A illustrates a perspective view of the mounting clip 500 and FIG. 5B illustrates a top view of the mounting clip 500.

The mounting clip 500 includes a connecting component 502, a first arm 504a, and a second arm 504b. The connecting component 502 is connected to the first arm 504a and the second arm 504b. The first arm 504a and the second arm 504b may extend from the connecting component 502 in a direction that follows a longitudinal axis 550 of the mounting clip 500. The first arm 504a includes a first retention component 510a and the second arm 504b includes a second retention component 510b. The first and second arms 504a and 504b also include first and second compression limiting components 520a and 520b, respectively and first and second stop components 530a and 530b, respectively.

The mounting clip 500 has many of the same features as the mounting clip 300 and performs in a similar manner. For example, the first and second arms 504a and 504b of the mounting clip 500 have a C-shaped cross-sectional profile similar to the mounting clip 300. However, unlike the mounting clip 300, the connecting component 502 has a flat rectangular cross-sectional profile. In addition, the outer surfaces of the first and second arms 504a and 504b are straight and do not curve inward with the first and second compression limiting components 520a and 520b.

Figure 6A:
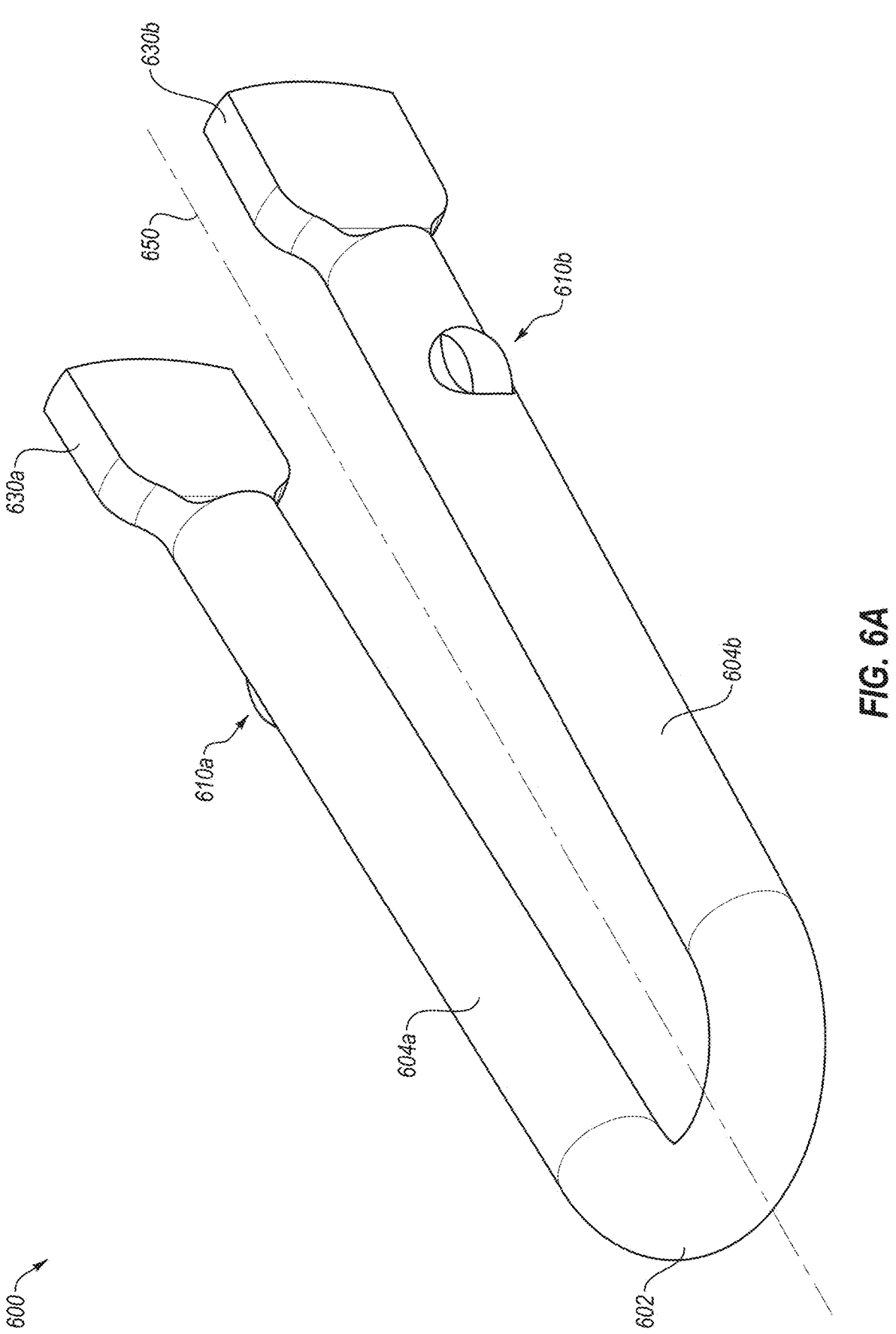
FIGS. 6A-6B illustrate a fifth exemplary mounting pin.
Figure 6B:
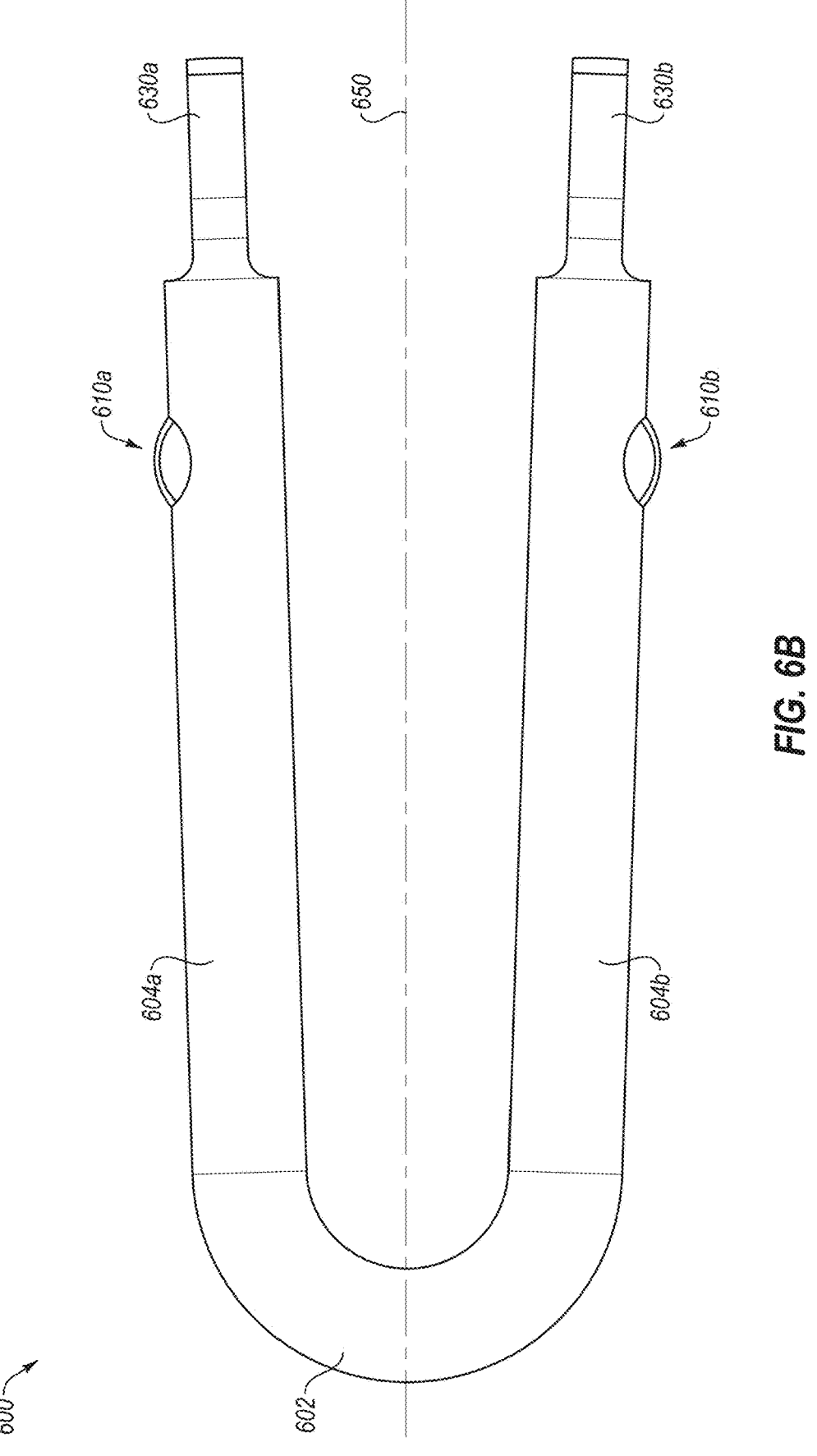

FIGS. 6A-6B illustrate another mounting pin that may be implemented in the PV module mounting system 100 of FIG. 1. Specifically, the mounting pin illustrated in FIGS. 6A-6B is a mounting clip 600. Different views of the mounting clip 600 are provided in FIGS. 6A-6B. For example, FIG. 6A illustrates a perspective view of the mounting clip 600 and FIG. 6B illustrates a top view of the mounting clip 600.

The mounting clip 600 includes a connecting component 602, a first arm 604a, and a second arm 604b. The connecting component 602 is connected to the first arm 604a and the second arm 604b. The first arm 604a and the second arm 604b may extend from the connecting component 602 in a direction that follows a longitudinal axis 650 of the mounting clip 600. The first arm 604a includes a first retention component 610*a* and the second arm 604*b* includes a second retention component 610*b*. The first and second arms 604*a* and 604*b* also include first and second stop components 630*a* and 630*b*, respectively.

The mounting clip 600 has many of the same features as the mounting clip 200 and performs in a similar manner. For example, the first and second arms 604*a* and 604*b* of the mounting clip 600 have a circular cross-sectional profile similar to the mounting clip 200. However, unlike the mounting clip 200, the first and second arms 604*a* and 604*b* are straight. The mounting clip 600 lacks compression limiting components and the shape of the first and second stop components 630*a* and 630*b* differ from the first and second stop components 230*a* and 230*b* of the mounting clip 200.

Figure 7A:
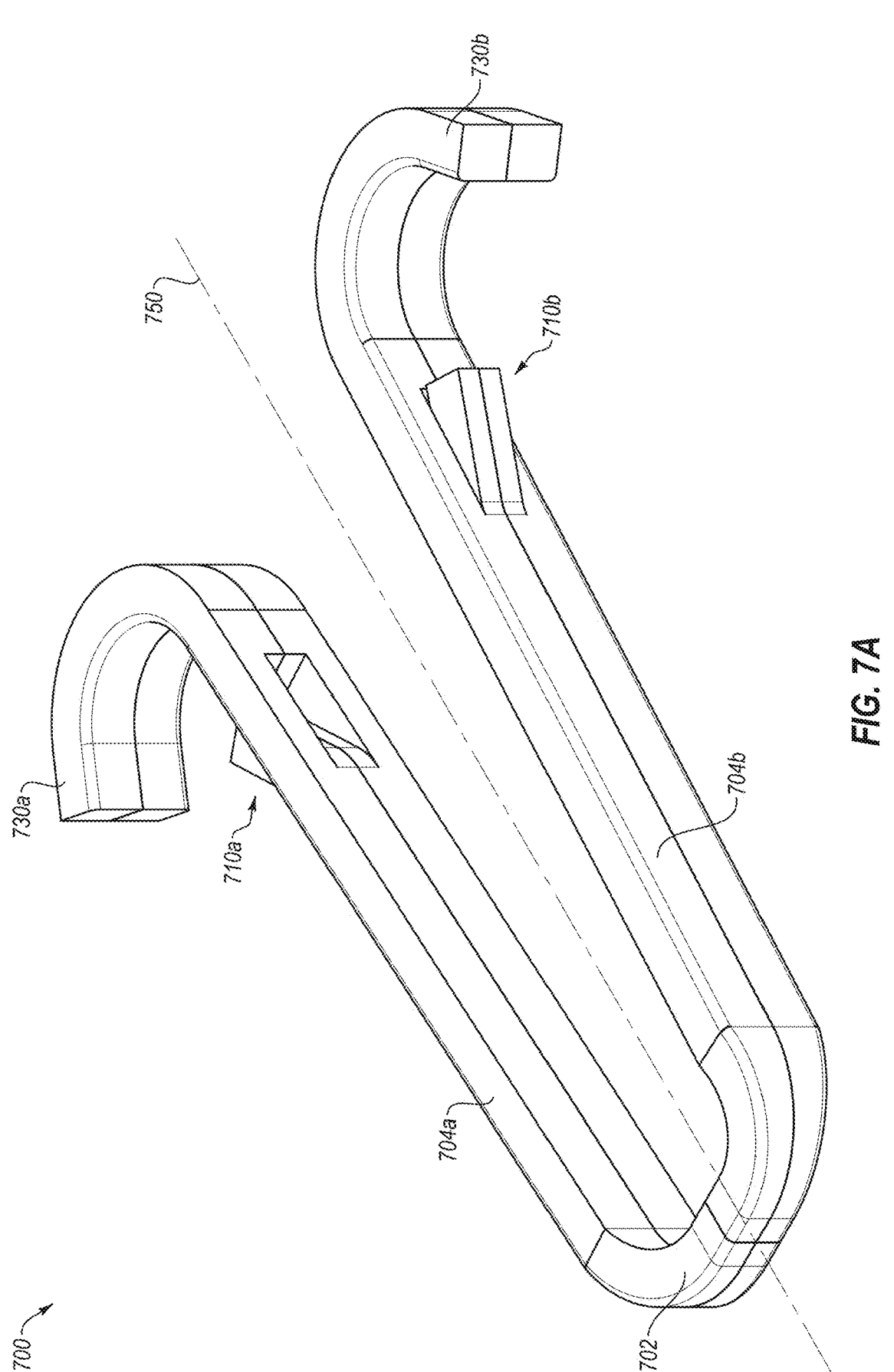
FIGS. 7A-7C illustrate a sixth exemplary mounting pin.
Figure 7B:
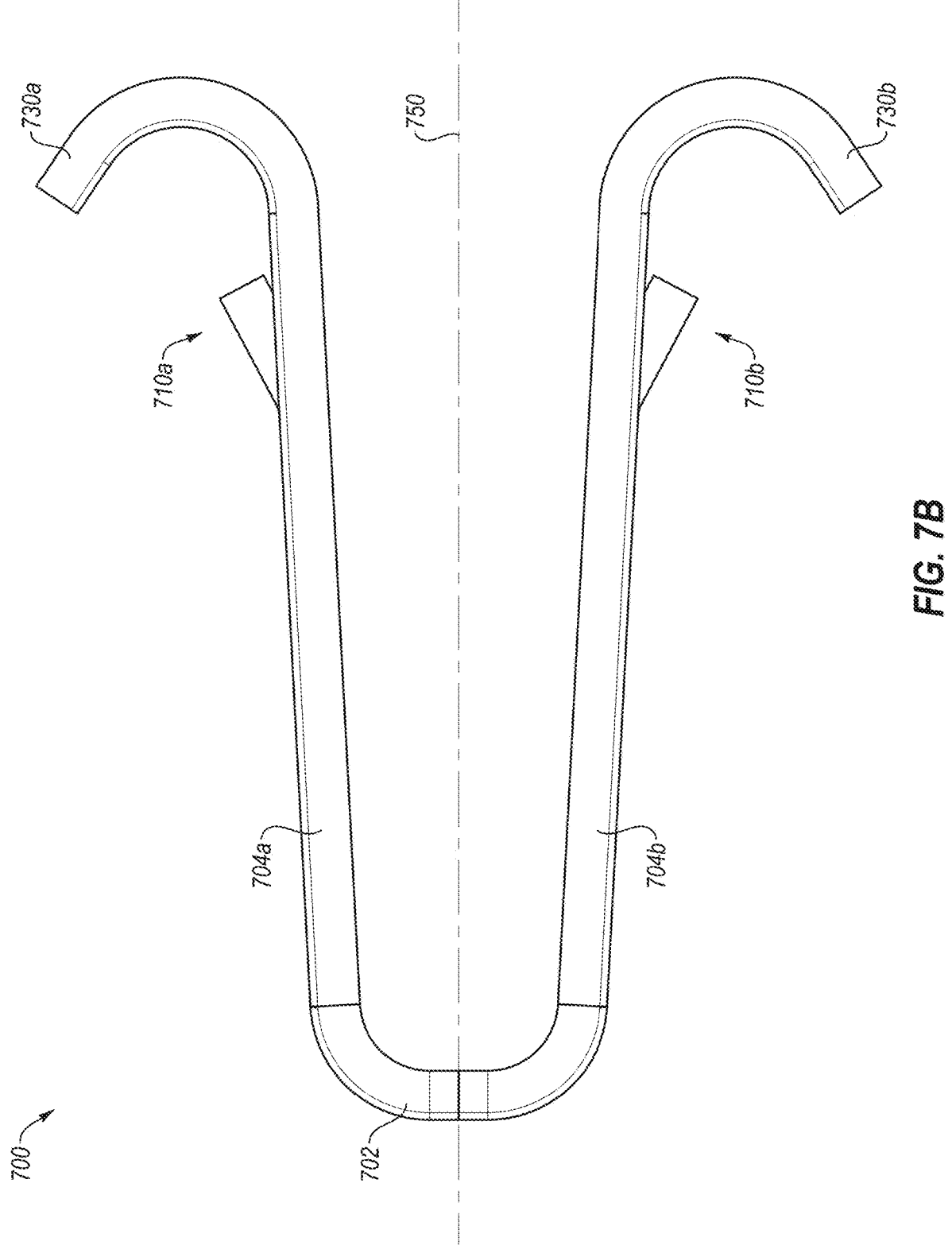
Figure 7C:
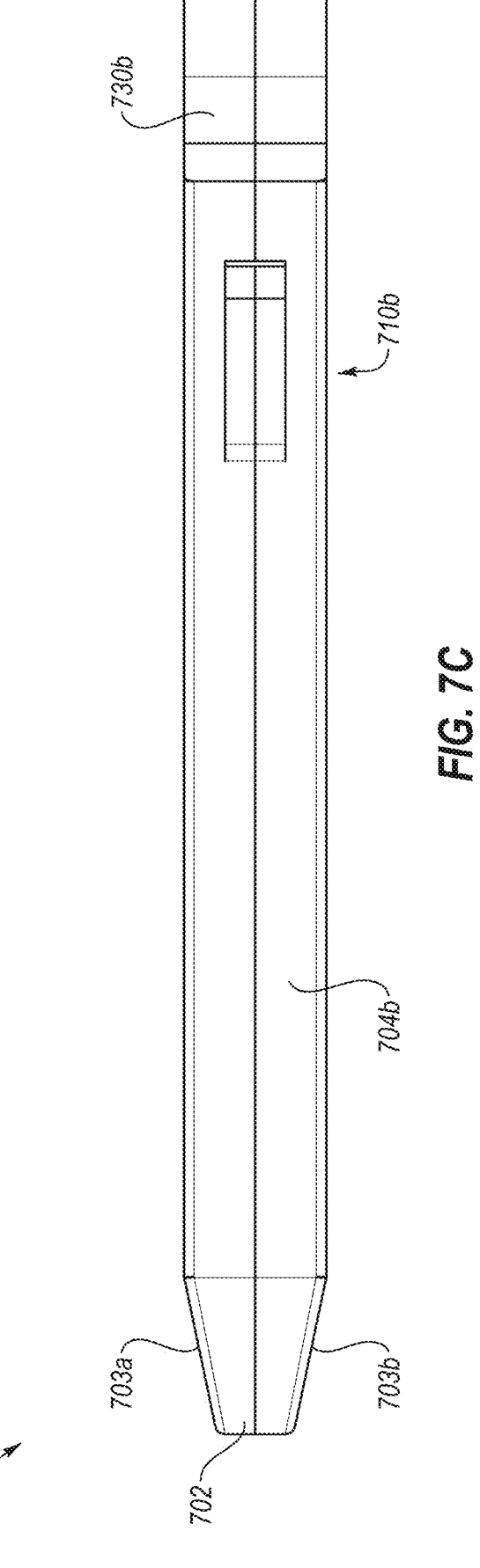

FIGS. 7A-7C illustrate another mounting pin that may be implemented in the PV module mounting system 100 of FIG. 1. Specifically, the mounting pin illustrated in FIGS. 7A-7C is a mounting clip 700. Different views of the mounting clip 700 are provided in FIGS. 7A-7C. For example, FIG. 7A illustrates a perspective view of the mounting clip 700, FIG. 7B illustrates a top view of the mounting clip 700, and FIG. 7C illustrates a side view of the mounting clip 700.

The mounting clip 700 includes a connecting component 702, a first arm 704*a*, and a second arm 704*b*. The connecting component 702 is connected to the first arm 704*a* and the second arm 704*b*. The first arm 704*a* and the second arm 704*b* may extend from the connecting component 702 in a direction that follows a longitudinal axis 750 of the mounting clip 700. The first arm 704*a* includes a first retention component 710*a* and the second arm 704*b* includes a second retention component 710*b*. The first and second arms 704*a* and 704*b* also include first and second stop components 730*a* and 730*b*, respectively.

The mounting clip 700 has many of the same features as the mounting clips described previously and it performs in a similar manner. Unlike previously discussed mounting clips, the mounting clip 700 has a rectangular cross-sectional shape and the first and second stop components 730*a* and 730*b* hook back in a direction toward the connecting component 702.

In some embodiments, in order to facilitate positioning of the mounting clip 700 within mounting clip openings, all or a portion of the connecting component 702 may have ramped surfaces 703*a* and 703*b*. The ramped surfaces 703*a* and 703*b* (shown in FIG. 4C) are on both sides of the mounting clip 700 and may simplify inserting the mounting clip 700 into one or both of a mounting pin opening in a module rail and a mounting pin opening in a mounting bracket.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A module mounting assembly, comprising:
a mounting bracket including a first clip opening that is configured to align with a second clip opening in a module rail when the mounting bracket is installed as part of a module mounting system;

a clamp coupled to the mounting bracket, the clamp being configured to attach the mounting bracket to a support structure; and
a mounting clip configured to be inserted at least partially through the first and second clip openings, the mounting clip having an uninstalled state, a compressed state, and an installed state, wherein:
in the uninstalled state, a distance between two surfaces of the mounting clip is larger than a width of the first and second clip openings,
in the compressed state, the distance between the two surfaces is smaller than the width of the first and second clip openings, and
in the installed state the two surfaces are configured to engage edges of at least one of the first and second clip openings to retain the mounting clip within the first and second clip openings through a friction attachment.

2. The module mounting assembly of claim 1, wherein the mounting clip includes:
a first arm having a proximal end and a distal end,
a second arm having a proximal end and a distal end, and
a connecting component that couples the proximal end of the first arm to the proximal end of the second arm, the connecting component being configured to elastically deform to change the distance between the two surfaces and apply a spring force when not in the uninstalled state.

3. The module mounting assembly of claim 2, wherein:
the first arm defines a first retention component,
the second arm defines a second retention component, and
the first retention component and the second retention component are configured to engage with edges of at least one of the first and second clip openings to assist in preventing the mounting clip from moving relative to the module rail when in the installed state.

4. The module mounting assembly of claim 3, wherein the spring force applied by the connecting component when the mounting clip is in the installed state is configured to cause the first retention component and the second retention component to maintain the engagement with at least one of the module rail or the mounting bracket.

5. The module mounting assembly of claim 4, wherein:
the first retention component comprises a first slot and a first tab physically positioned proximate the first slot,
the second retention component comprises a second slot and a second tab physically positioned proximate the second slot, and
the spring force applied by the connecting component causes the first tab and the second tab to engage with inside surfaces of at least one of the module rail or the mounting bracket.

6. The module mounting assembly of claim 2, wherein:
the first arm comprises a first compression limiting component,
the second arm comprises a second compression limiting component, and
the first and second compression limiting components are configured to limit an amount that the connecting component is permitted to deform.

7. The module mounting assembly of claim 2, wherein:
the first arm comprises a first stop component,
the second arm comprises a second stop component, and
the first and second stop components are configured to limit an insertion depth of the mounting clip into at least one of the first mounting clip opening and the second mounting clip opening.

8. The module mounting assembly of claim 2, wherein a surface of the mounting clip includes a lubricant coating to facilitate positioning the mounting clip within the first mounting clip opening and the second mounting clip opening.

*    *    *    *    *